United States Patent
Seo et al.

(10) Patent No.: US 9,766,755 B2
(45) Date of Patent: Sep. 19, 2017

(54) TOUCH SENSING SYSTEM ADJUSTING VOLTAGE OF DRIVING SIGNAL BASED ON A DISTANCE FROM A TOUCH SENSING CIRCUIT AND METHOD FOR DRIVING THE SAME

(71) Applicant: LG DISPLAY CO., LTD., Seoul (KR)

(72) Inventors: Sangwoo Seo, Daegu (KR); Jaedo Lee, Gyeongsangbuk-do (KR); Beom Jeong, Daejeon (KR); Sungpil Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 171 days.

(21) Appl. No.: 14/079,798

(22) Filed: Nov. 14, 2013

(65) Prior Publication Data
US 2014/0139480 A1  May 22, 2014

(30) Foreign Application Priority Data

Nov. 16, 2012 (KR) .................. 10-2012-0130538
Nov. 22, 2012 (KR) .................. 10-2012-0132854

(51) Int. Cl.
  *G06F 3/045* (2006.01)
  *G06F 3/044* (2006.01)
  *G06F 3/041* (2006.01)

(52) U.S. Cl.
  CPC ............ *G06F 3/044* (2013.01); *G06F 3/0416* (2013.01)

(58) Field of Classification Search
  CPC ............................ G06F 3/044; G06F 3/0416
  USPC ........................................... 345/174
  See application file for complete search history.

(56) References Cited

U.S. PATENT DOCUMENTS

| 2009/0009498 | A1* | 1/2009 | Nishimura ........... G09G 3/3688 345/205 |
| 2009/0189867 | A1* | 7/2009 | Krah ...................... G06F 3/044 345/173 |
| 2012/0182255 | A1 | 7/2012 | Kuang et al. |
| 2012/0268397 | A1* | 10/2012 | Lee ........................ G06F 3/044 345/173 |

(Continued)

FOREIGN PATENT DOCUMENTS

| CN | 101339752 A | 1/2009 |
| CN | 101957697 A | 1/2011 |
| CN | 102591511 A | 7/2012 |

OTHER PUBLICATIONS

Office Action dated Mar. 2, 2016, issued by the State Intellectual Property Office of the People's Republic of China in Chinese Patent Application No. 201310575027.9.

*Primary Examiner* — Jonathan Blancha
(74) *Attorney, Agent, or Firm* — Morgan, Lewis & Bockius LLP

(57) ABSTRACT

A touch sensing system and a method for driving the same are disclosed. The touch sensing system includes a touch screen including touch sensors and a touch sensing circuit applying a driving signal to the touch sensors. The touch sensing circuit applies at least one first driving signal to a first position of the touch screen and applies at least one second driving signal to a second position of the touch screen. When RC delay of the first position is less than RC delay of the second position, at least one of a width and a voltage of the second driving signal is greater than the first driving signal, or the number of second driving signals is more than the number of first driving signals.

17 Claims, 27 Drawing Sheets

(56) References Cited

U.S. PATENT DOCUMENTS

2014/0049509 A1\* 2/2014 Shepelev .............. G06F 3/0416
                                                            345/174

\* cited by examiner

OR (a)

(b)

TOUCH SENSING SYSTEM ADJUSTING VOLTAGE OF DRIVING SIGNAL BASED ON A DISTANCE FROM A TOUCH SENSING CIRCUIT AND METHOD FOR DRIVING THE SAME

This application claims the benefit of Korean Patent Application No. 10-2012-0130538 filed on Nov. 16, 2012, and Korean Patent Application No. 10-2012-0132854 filed on Nov. 22, 2012, the entire contents of which is incorporated herein by reference for all purposes as if fully set forth herein.

BACKGROUND OF THE INVENTION

Field of the Invention

Embodiments of the invention relate to a touch sensing system and a method for driving the same.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

A capacitive touch sensing system includes a capacitive touch screen which has durability and definition better than an existing resistive touch screen and is able to recognize a multi-touch input and a proximity touch input. Hence, the capacitive touch sensing system may be applied to various applications.

The size of mobile information terminals using the touch UI is becoming larger and larger. Thus, the touch UI is expected to be applied to large-sized display devices such as computer monitors in the future. As the size of the touch screen increases, the length of lines used in the touch screen lengthens. Hence, a resistance and a capacitance of the touch screen increase, and an RC delay of a driving signal applied to the touch screen increases. FIGS. 1 and 2 illustrate examples of the RC delay.

As the size of the touch screen increases, the RC delay varies depending on a position of the touch screen. Therefore, an amount of charges supplied to touch sensors of the touch screen varies, and a discharge delay of undesired remaining charges is caused in the touch sensors. Hence, a signal-to-noise ratio (often abbreviated SNR) of the signal read from the touch screen is not good. Because a length of a sensing period of the touch screen increases due to an increase in the size of the touch screen, a touch report rate is reduced. When the touch report rate is reduced, touch sensitivity is further reduced. Touch raw data obtained by sensing the touch sensors of the touch screen during the sensing period is analyzed to calculate coordinates of the touch raw data, and coordinate informations of the touch raw data are gathered. The touch report rate is a velocity or a frequency, at which the gathered coordinate informations are transmitted to an external host system. As the touch report rate increases, a latency between a touch input and a coordinate recognition is reduced. Therefore, the touch sensitivity a user feels increases.

FIG. 1 illustrates a portion of a mutual capacitive touch screen. In FIG. 1, Tx1 to Tx5 denote Tx lines to which a driving signal is applied, and Rx1 to Rx6 denote Rx lines receiving voltages of touch sensors Cm. A mutual capacitive touch screen TSP is connected to a readout integrated circuit (ROIC) which drives the touch screen TSP and receives the voltages of the touch sensors Cm. The ROIC applies the driving signal to the Tx lines Tx1 to Tx5 and receives the voltages of the touch sensors Cm through the Rx lines Rx1 to Rx6.

If the touch sensors Cm close to the ROIC have a small RC delay, there is an increase in an amount of charges $\Delta Q1$ (refer to FIG. 2) charged when the driving signal is applied to the touch sensors Cm close to the ROIC. On the other hand, if the touch sensors Cm far away from the ROIC have a large RC delay, there is a reduction in an amount of charges $\Delta Q2$ (refer to FIG. 2) charged when the driving signal is applied to the touch sensors Cm far away from the ROIC. As the RC delay increases, a discharge time of the touch sensors Cm increases. Thus, as the touch sensors Cm are far away from a portion of the touch screen TSP to which the driving signal is applied, an amount of charges charged to the touch sensors Cm decreases due to the RC delay, and a discharge of remaining charges is delayed.

SUMMARY OF THE INVENTION

Embodiments of the invention provide a touch sensing system and a method for driving the same uniformalizing the charge characteristics of the touch sensors over the whole surface of the large size touch screen.

In one aspect, there is a touch sensing system comprising a touch screen including touch sensors and a touch sensing circuit configured to apply a driving signal to the touch sensors.

The touch sensing circuit applies at least one first driving signal to a first position of the touch screen and applies at least one second driving signal to a second position of the touch screen.

When RC delay of the first position is less than RC delay of the second position, at least one of a width and a voltage of the second driving signal is greater than the first driving signal, or the number of second driving signals is more than the number of first driving signals.

In another aspect, there is a method for driving a touch sensing system comprising applying at least one first driving signal to a first position of the touch screen and applying at least one second driving signal to a second position of the touch screen.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

A touch sensing system according to an exemplary embodiment of the invention may be implemented as a capacitive touch screen which senses a touch input through a plurality of capacitive sensors. The capacitive touch screen includes a plurality of touch sensors. Each touch sensor has a capacitance when viewed through an equivalent circuit. The capacitive touch screen may be classified into a self capacitive touch screen and a mutual capacitive touch screen. In the following description, the mutual capacitive touch screen will be described as an example of the capacitive touch screen. Other types of capacitive touch screens may be used.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
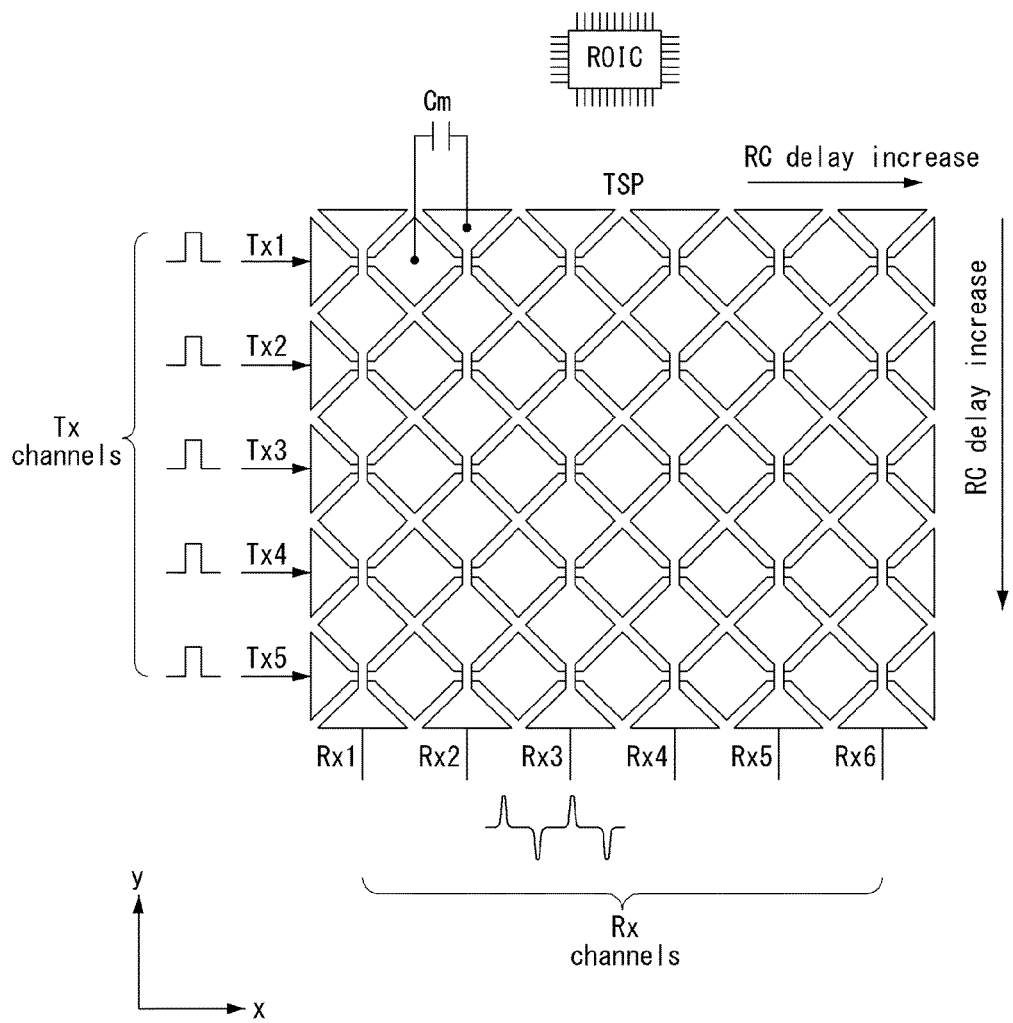
FIG. 1 illustrates a portion of a mutual capacitive touch screen.
Figure 2:
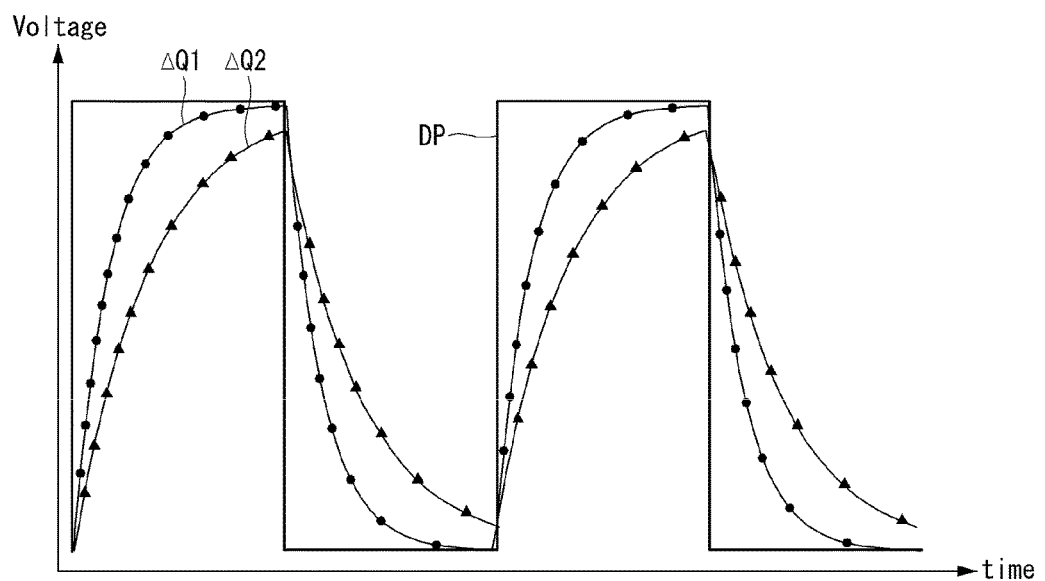
FIG. 2 illustrates an non-uniformity of an amount of charges charged to touch sensors due to an RC delay of a touch screen.
Figure 3:
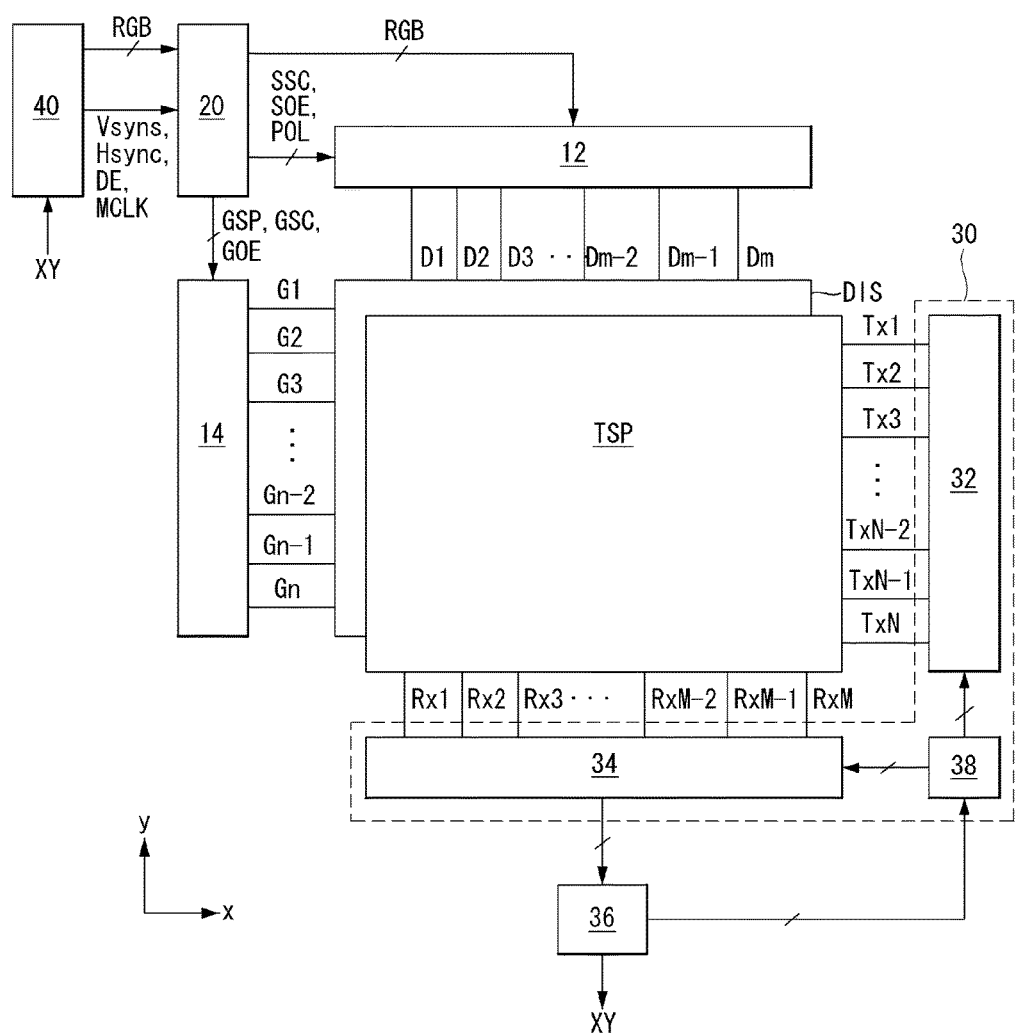
FIG. 3 illustrates a touch sensing system according to an exemplary embodiment of the invention.
Figure 4:
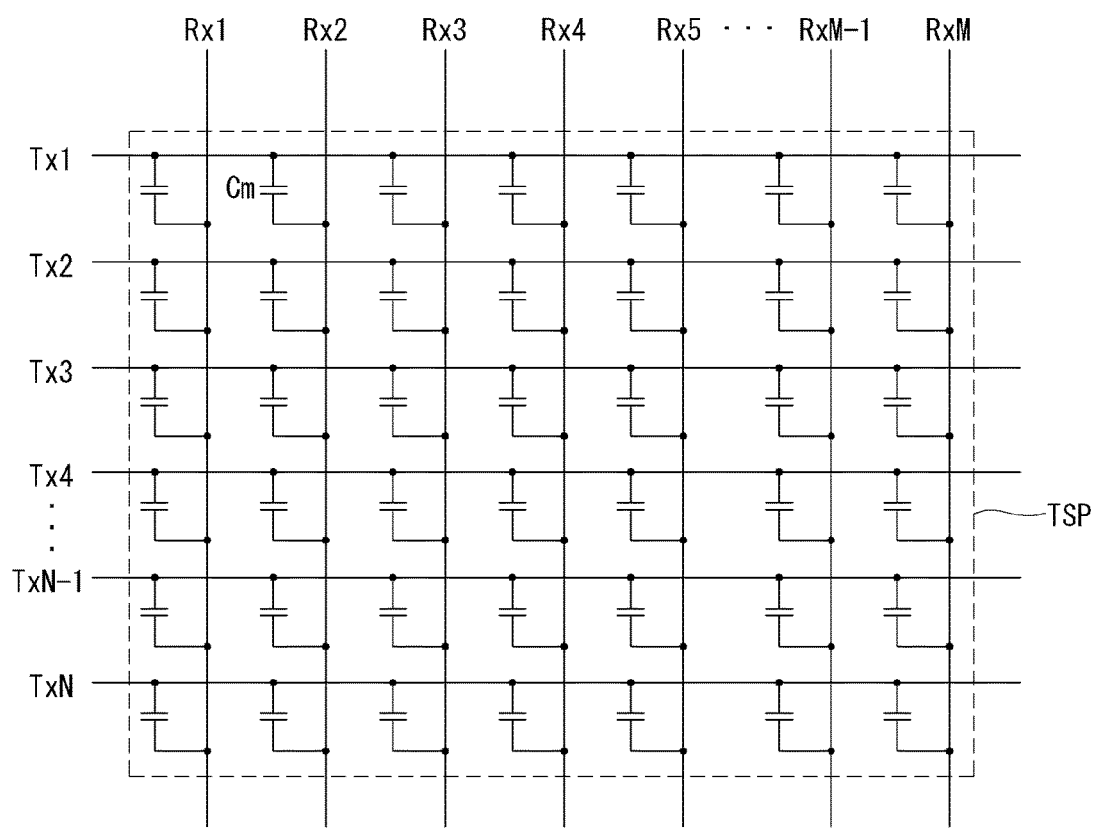
FIG. 4 is an equivalent circuit diagram of a touch screen shown in FIG. 3.
Figure 5:
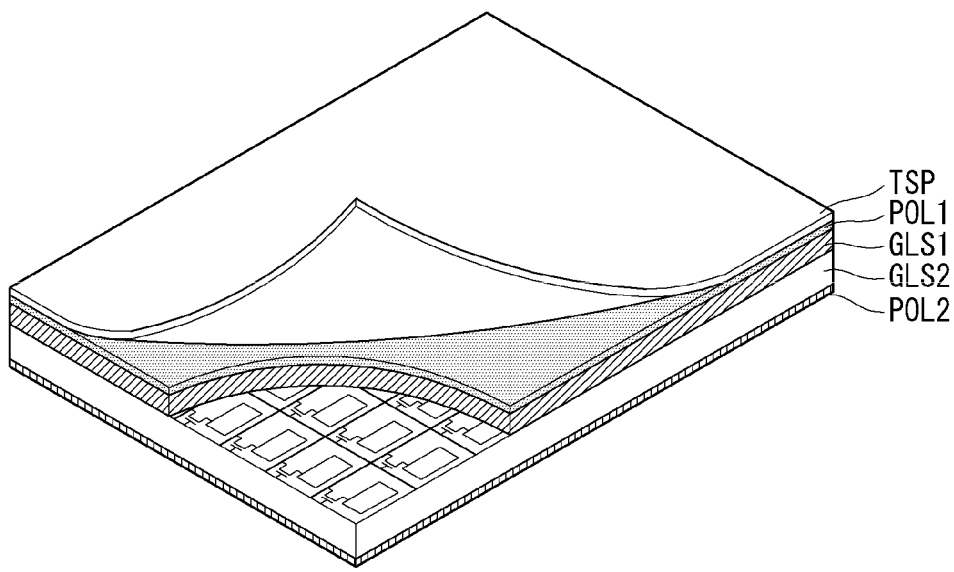
FIGS. 5 to 7 illustrate various combinations of a touch screen and a display panel according to an exemplary embodiment of the invention.
Figure 6:
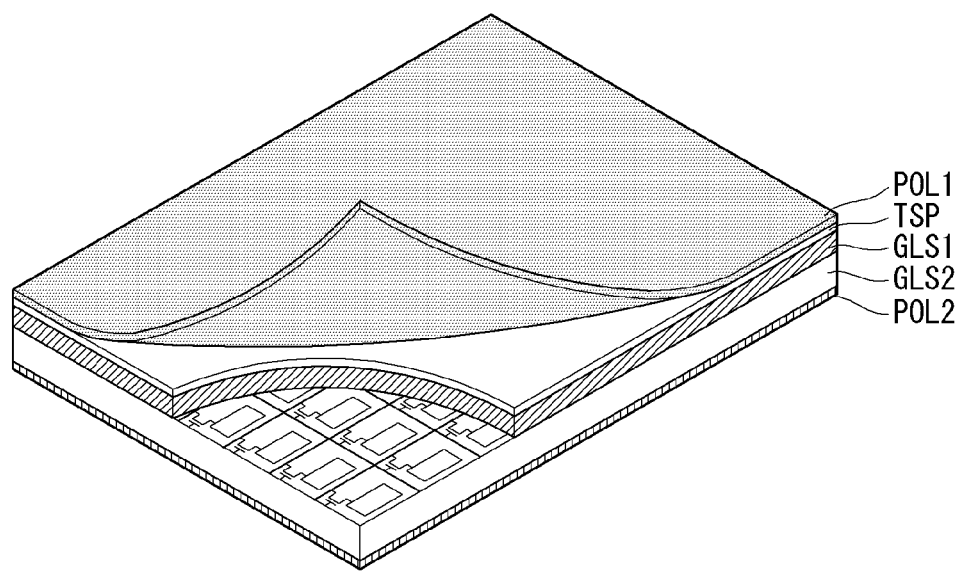
Figure 7:
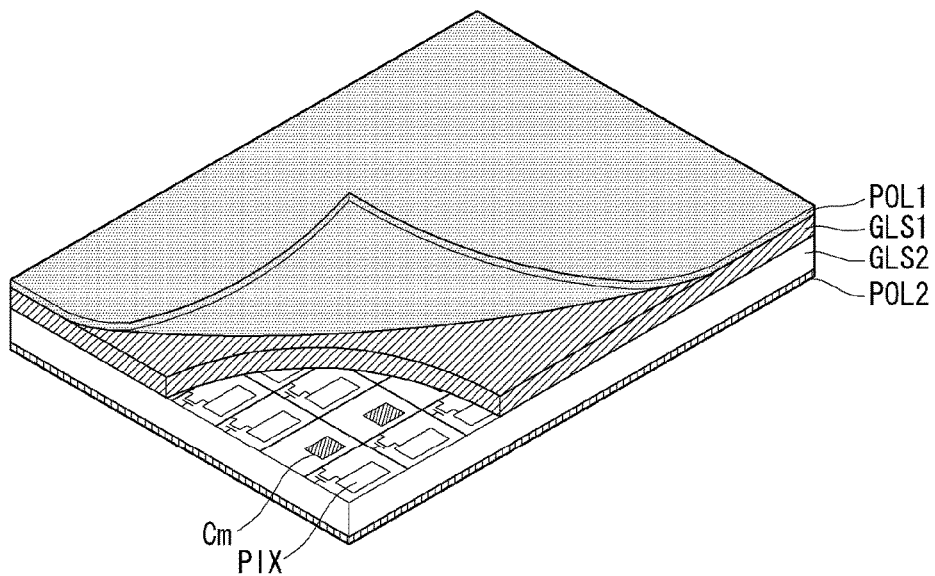
Figure 7:
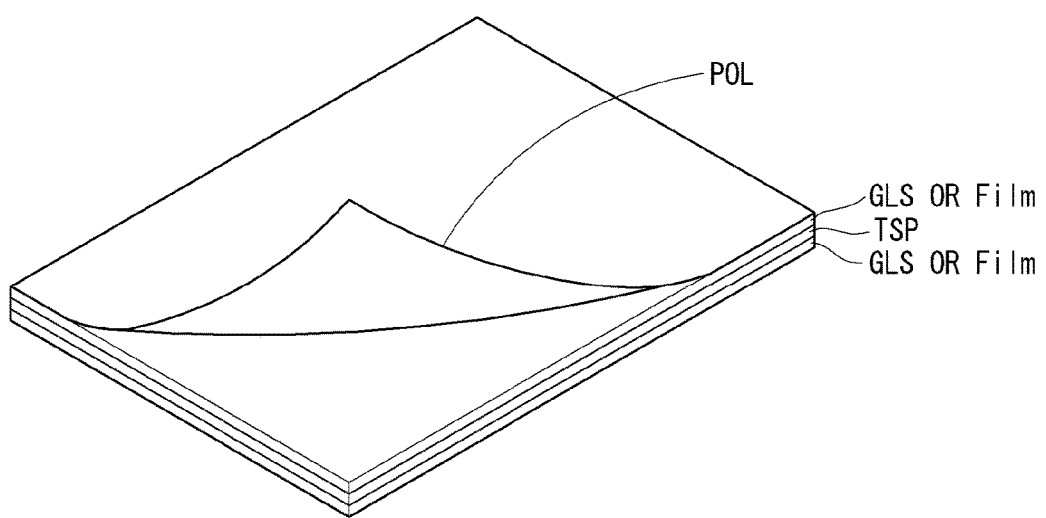

As shown in FIGS. 3 to 7, the touch sensing system according to the embodiment of the invention includes a touch screen TSP, a display driving circuit, a touch screen driving circuit, etc. As shown in FIG. 5, the touch screen TSP may be attached to an upper polarizing plate POL1 of a display panel DIS. Alternatively, as shown in FIG. 6, the touch screen TSP may be formed between the upper polarizing plate POL1 and an upper substrate GLS1 of the display panel DIS. Alternatively, as shown in FIG. 7, touch sensors Cm of the touch screen TSP may be embedded in a lower substrate GLS2 of the display panel DIS along with a pixel array of the display panel DIS in an in-cell type or may be embedded between substrates 'GLS OR FILM'. The substrates of the display panel DIS may be manufactured as a glass substrate or a film substrate. In FIGS. 5 to 7, 'PIX' denotes a pixel electrode of a liquid crystal cell, and 'POL2' denotes a lower polarizing plate.

The display panel DIS according to the embodiment of the invention may be implemented as a display panel of a flat panel display, such as a liquid crystal display (LCD), a field emission display (FED), a plasma display panel (PDP), an organic light emitting display, and an electrophoresis display (EPD). The pixel array of the display panel DIS includes a plurality of pixels formed in pixel areas defined by data lines D1 to Dm and gate lines (or scan lines) G1 to Gn, where m and n are a positive integer. Each of the pixels includes a plurality of thin film transistors (TFTs), a storage capacitor Cst, etc. The TFTs are formed at crossings of the data lines D1 to Dm and the gate lines G1 to Gn. The display panel DIS may include a color filter array for color representation.

The display driving circuit includes a data driving circuit 12, a scan driving circuit 14, and a timing controller 20. The display driving circuit applies a video data voltage of an input image to the pixels of the display panel DIS. The data driving circuit 12 converts digital video data RGB received from the timing controller 20 into positive and negative analog gamma compensation voltages and outputs the data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS to which the data voltage will be applied.

The timing controller 20 receives timing signals, such as a vertical sync signal Vsync, a horizontal sync signal Hsync, a data enable signal DE, and a main clock MCLK, from a host system 40. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

The touch screen TSP includes Tx lines Tx1 to TxN, where N is a positive integer, Rx lines Rx1 to RxM crossing the Tx lines Tx1 to TxN, where M is a positive integer, and MN touch sensors Cm formed at crossings of the Tx lines Tx1 to TxN and the Rx lines Rx1 to RxM. Each touch sensors Cm has a mutual capacitance.

The touch screen driving circuit includes a touch sensing circuit 30 and a coordinate calculator 36. The touch screen driving circuit supplies a driving signal to the touch screen TSP and senses changes in voltages of the touch sensors Cm. The touch screen driving circuit transmits coordinate information of a touch input position to a host system 40.

The host system 40 may be implemented as one of a television system, a set-top box, a navigation system, a DVD player, a Blu-ray player, a personal computer (PC), a home theater system, and a phone system. The host system 40 includes a system on chip (SoC) including a scaler embedded therein and thus converts the digital video data RGB of an input image into a format suitable for displaying on the display panel DIS. The host system 40 transmits the digital video data RGB and the timing signals Vsync, Hsync, DE, and MCLK to the timing controller 20. Further, the host system 40 runs an application associated with coordinate information XY of touch data received from the coordinate calculator 36.

The touch sensing circuit 30 includes a Tx driving circuit 32, an Rx driving circuit 34, a Tx/Rx controller 38, etc.

In a normal operation mode, the touch sensing circuit 30 applies the driving signal to the touch sensors Cm through the Tx lines Tx1 to TxN using the Tx driving circuit 32. The touch sensing circuit 30 senses the voltages of the touch sensors Cm in synchronization with the driving signal through the Rx lines Rx1 to RxM and the Rx driving circuit 34 and outputs touch raw data, which is digital data.

The driving signal compensate for RC delay and may be as generated in waveforms shown in FIGS. 10, 12 to 16, and 21 to 29, so as to uniformize an amount of charges charged to the touch sensors Cm even at any position of the touch screen TSP. The touch sensing circuit 30 may be integrated into one readout integrated circuit (ROIC). Further, the touch sensing circuit 30 and the coordinate calculator 36 may be integrated into one touch integrated circuit.

If the size and a resolution of the touch screen TSP increase, the number of Tx channels and the number of Rx channels of the touch screen TSP may increase. Thus, when the size and the resolution of the touch screen TSP increase, two or more touch ICs IC#1 and IC#2 have to be connected to the touch screen TSP as shown in FIG. 30. Each of the touch ICs IC#1 and IC#2 generates the driving signal of the waveforms shown in FIGS. 10, 12 to 16, and 21 to 29, In the normal operation mode, the Tx driving circuit 32 selects a Tx channel, to which the driving signal will be output, in response to a Tx setup signal from the Tx/Rx controller 38 and applies the driving signal to the Tx lines Tx1 to TxN connected to the selected Tx channel. The Tx lines Tx1 to TxN are charged during a high potential period of the driving signal and supply charges to the touch sensors Cm. The Tx lines Tx1 to TxN are discharged during a low potential period of the driving signal. The driving signal may be successively supplied to the Tx lines Tx1 to TxN N times, so that the voltages of the touch sensors Cm are accumulated in a capacitor Cs (refer to FIG. 8) of an integrator embedded in the Rx driving circuit 34 through the Rx lines Rx1 to RxM N times, where N is a positive integer equal to or greater than 2.

Figure 8:
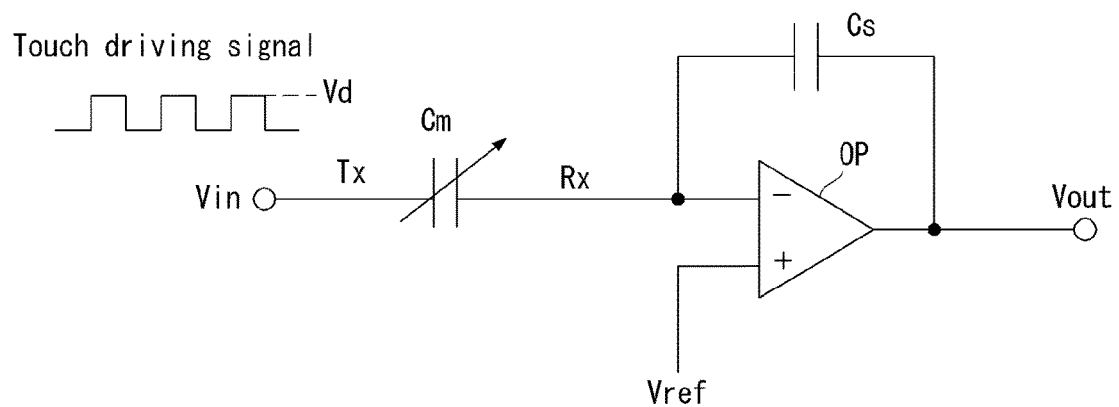
FIG. 8 is a circuit diagram of an integrator of an Rx driving circuit.
Figure 9:
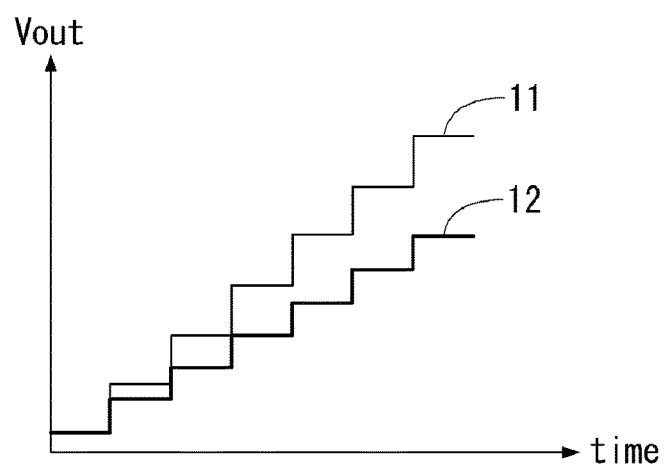
FIG. 9 is a waveform diagram showing changes in a voltage of a touch sensor before and after a touch operation.

As shown in FIG. 8, the Rx driving circuit 34 accumulates the voltages of the touch sensors Cm in the capacitor Cs of the integrator in synchronization with the driving signal and converts the accumulated voltages of the touch sensors Cm into the digital data using an analog-to-digital converter (ADC), thereby outputting the touch raw data. Changes in the voltages of the touch sensors Cm before and after a touch operation are described. When the touch sensors Cm are touched, capacitances of the touch sensors Cm in Equation Q (charge)=C (capacitance)×V (voltage) are reduced. Hence, the changes in the voltages of the touch sensors Cm before and after the touch operation are greater than the changes in the voltages of the touch sensors Cm in which there is no touch input. Thus, it may be decided whether or not the touch input is generated through the changes in the voltages of the touch sensors Cm before and after the touch operation. The Rx driving circuit 34 converts the changes in the voltages of the touch sensors Cm before and after the touch operation into the digital data, i.e., the touch raw data and supplies the touch raw data to the coordinate calculator 36. In FIGS. 8 and 9, "Vd" denotes the voltage of the driving signal; "OP" denotes an operational amplifier of the integrator; "11" denotes an example of a waveform when the voltages of the touch sensors are accumulated in the integrator before the touch operation; and "12" denotes an example of a waveform when the voltages of the touch sensors are accumulated in the integrator after the touch operation.

The coordinate calculator 36 executes a previously determined touch recognition algorithm and compares the touch raw data, which is received from the Rx driving circuit 34 in the normal operation mode, with a previously determined threshold value. The touch recognition algorithm may use any well-known algorithm. The touch recognition algorithm detects touch raw data, which is equal to or greater than the threshold value. The touch raw data, which is equal to or greater than the threshold value, is decided as touch data obtained from the touch sensors Cm in which the touch input is generated. The coordinate calculator 36 executes the touch recognition algorithm and assigns an identification number to each of the touch raw data, which is equal to or greater than the threshold value. The coordinate calculator 36 calculates coordinates of the touch raw data, which is equal to or greater than the threshold value. The coordinate calculator 36 transmits the identification number and coordinate information of each of the touch raw data, which is equal to or greater than the threshold value, to the host system 40. The coordinate calculator 36 may be implemented as a microcontroller unit (MCU).

Figure 10:
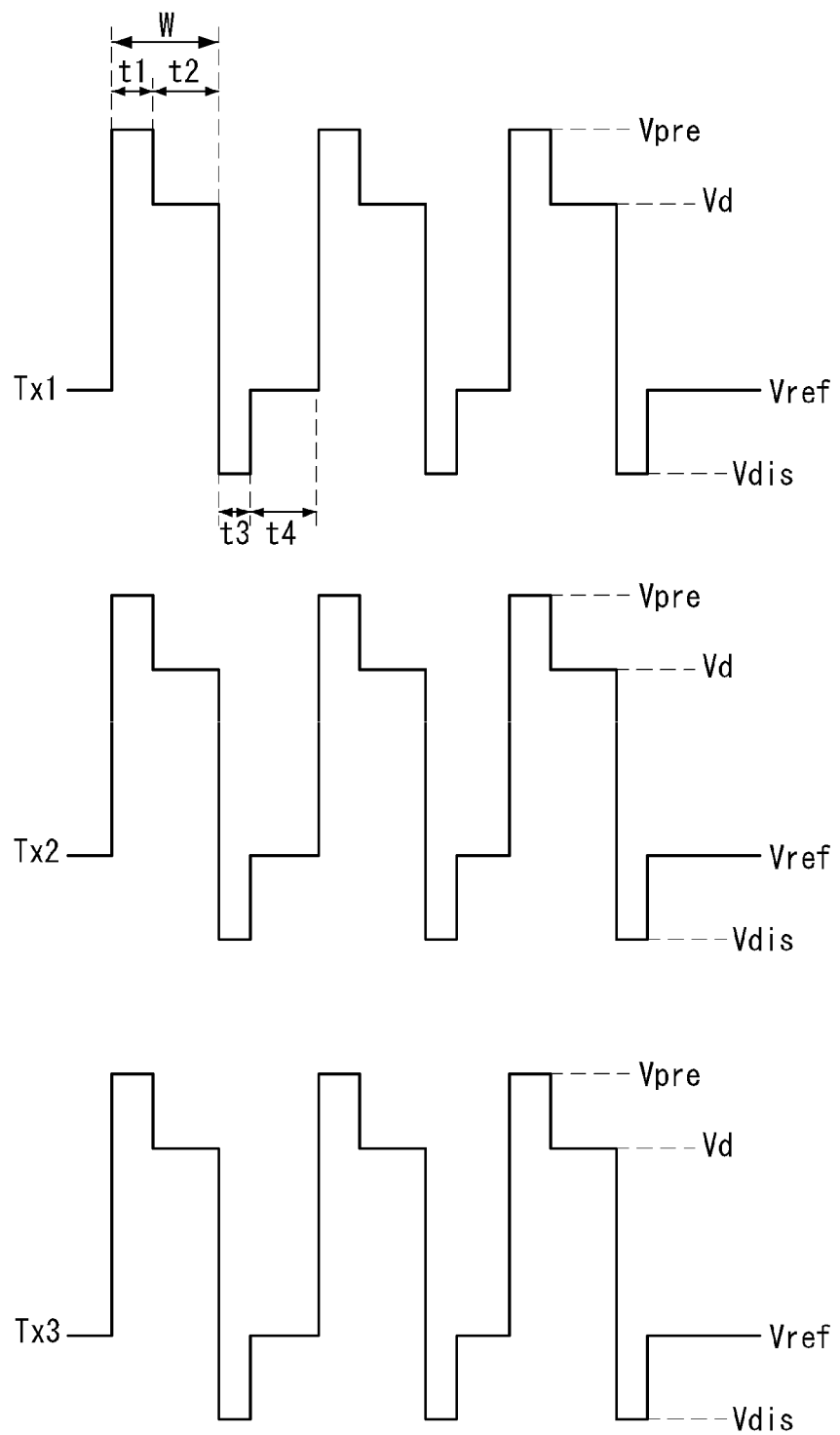
FIG. 10 is a waveform diagram showing driving signals according to a first embodiment of the invention.
Figure 11:
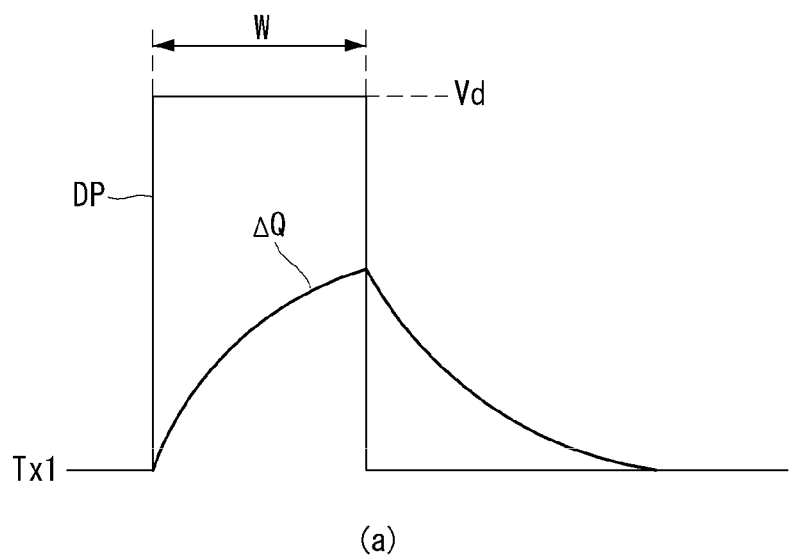
FIG. 11 is a waveform diagram showing changes in an amount of charges of touch sensors through a comparison between a related art driving signal and a driving signal shown in FIG. 10 according to an exemplary embodiment of the invention.
Figure 11:
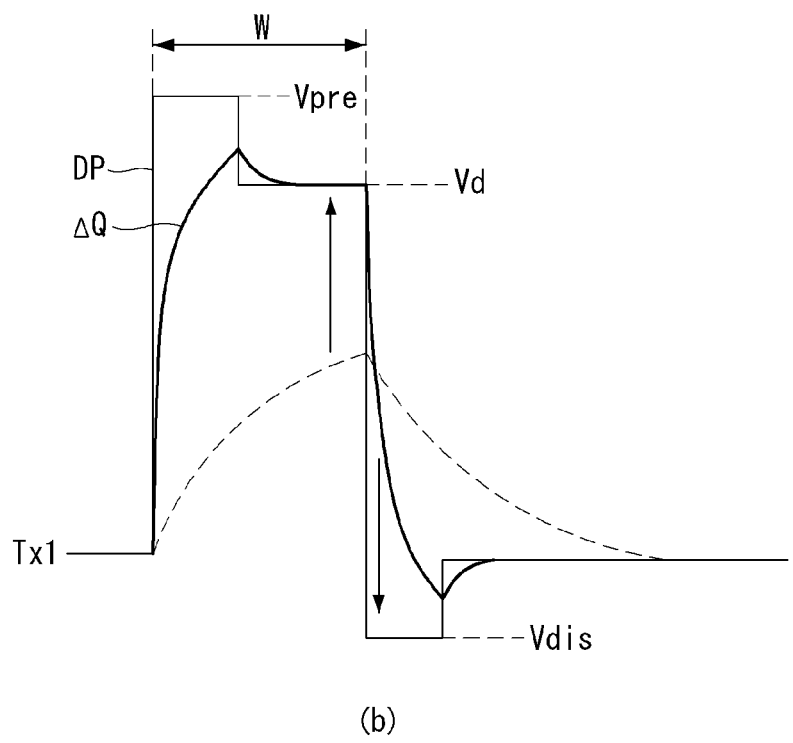

FIG. 10 is a waveform diagram showing a driving signal of the touch screen according to the embodiment of the invention. FIG. 11 is a waveform diagram showing changes in an amount of charges of the touch sensors through a comparison between a related art driving signal and the driving signal shown in FIG. 10 according to the embodiment of the invention. More specifically, in FIG. 11, (a) shows the related art driving signal, and (b) shows the driving signal according to the embodiment of the invention.

As shown in FIGS. 10 and 11, the driving signal according to the embodiment of the invention is generated in a multi-step waveform including a pre-charging period t1, a high potential holding period t2, a discharge acceleration period t3, and a reference potential period t4. The pre-charging period t1 is set to be earlier than the high potential holding period t2. The discharge acceleration period t3 is set to be later than the high potential holding period t2 and earlier than the reference potential period t4.

During the pre-charging period t1, a positive pre-charging voltage Vpre greater than a high potential driving voltage Vd is directly applied to the touch sensors Cm. As shown in (b) of FIG. 11, the touch sensors Cm are sharply charged to the pre-charging voltage Vpre during the pre-charging period t1. As shown in (a) of FIG. 11, in the related art driving signal, the touch sensors Cm are charged to the high potential driving voltage Vd without the pre-charging period t1. In FIG. 11, "ΔQ" denotes an amount of charges charged to the touch sensors Cm. The high potential driving voltage Vd may be set to about 2 V to 3V. The pre-charging voltage Vpre is properly selected depending on a pre-charging effect and a width W of the driving signal.

During the high potential holding period t2, the high potential driving voltage Vd is directly applied to the touch sensors Cm, and thus the touch sensors Cm are charged to the high potential driving voltage Vd. As shown in (b) of FIG. 11, the voltage of the touch sensors Cm sharply increases during the pre-charging period t1, and then is discharged to the high potential driving voltage Vd during the high potential holding period t2. Then, the voltage of the touch sensors Cm is held to the high potential driving voltage Vd.

During the discharge acceleration period t3, a reverse polarity discharge voltage Vdis is directly applied to the touch sensors Cm, and thus the touch sensors Cm are discharged. As shown in (b) of FIG. 11, the touch sensors Cm are sharply discharged during the discharge acceleration period t3.

During the reference potential period t4, a low potential reference voltage Vref is directly applied to the touch sensors Cm, and thus the touch sensors Cm are discharged. The low potential reference voltage Vref is set to be less than the high potential driving voltage Vd and greater than the reverse polarity discharge voltage Vdis. The low potential reference voltage Vref may be set to a ground level voltage or 0V. As shown in (b) of FIG. 11, the touch sensors Cm are discharged to the low potential reference voltage Vref during the reference potential period t4.

As can be seen from the comparison between (a) and (b) of FIG. 11, the embodiment of the invention may sufficiently increase the amount ΔQ of charges of the touch sensors Cm through the pre-charging effect in a short period of time and may discharge the touch sensors Cm in a short period of time by applying the reverse polarity discharge voltage Vdis to the touch sensors Cm. Thus, the embodiment of the invention may sufficiently and uniformly supply charges to the touch sensors Cm of the touch screen TSP having the large RC delay and may rapidly discharge the touch sensors Cm, thereby reducing a noise of a touch signal. Hence, a signal-to-noise ratio (often abbreviated SNR) of the touch signal may be improved. Furthermore, the embodiment of the invention may reduce a charge time and a discharge time of the touch sensors Cm to reduce the width W of the driving signal. Hence, the embodiment of the invention may reduce a touch report rate and may increase touch sensitivity.

Figure 12:
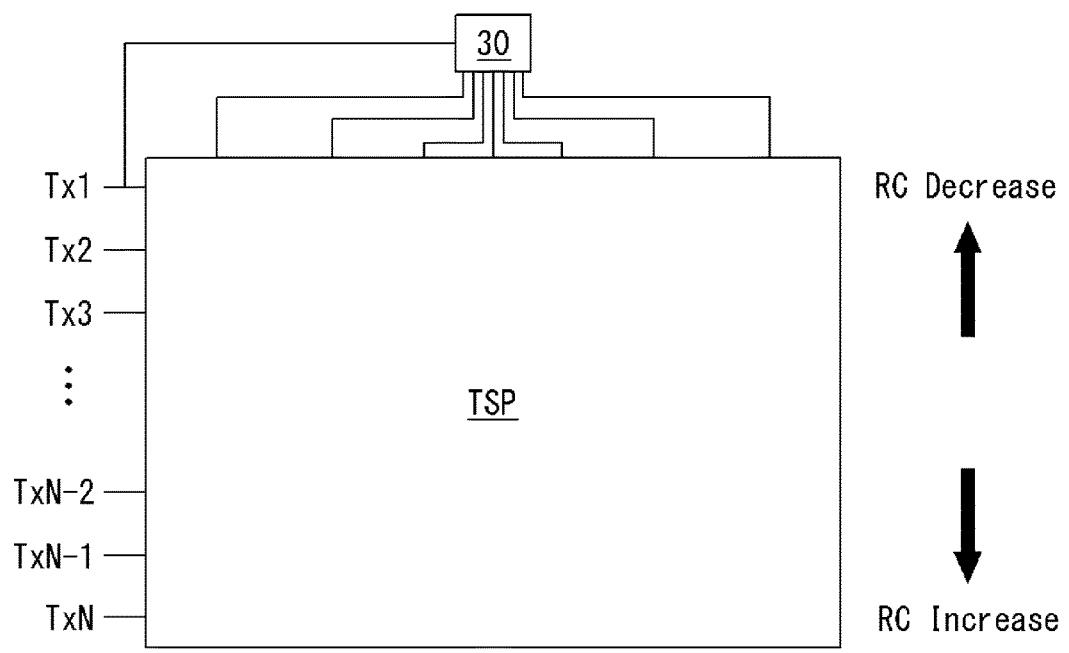
FIG. 12 illustrates an example of connecting a touch screen and a touch sensing circuit in a touch sensing system according to an exemplary embodiment of the invention.
Figure 13:
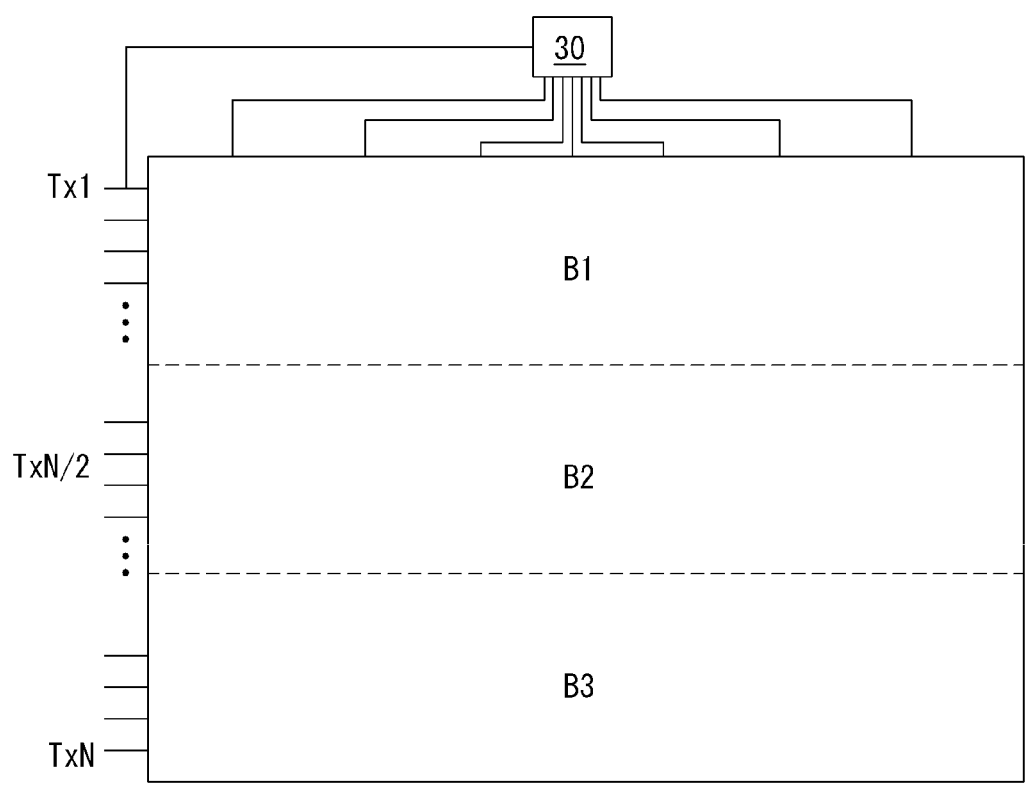
FIG. 13 illustrates a method for dividedly driving a touch screen in a touch sensing system according to an exemplary embodiment of the invention.
Figure 14:
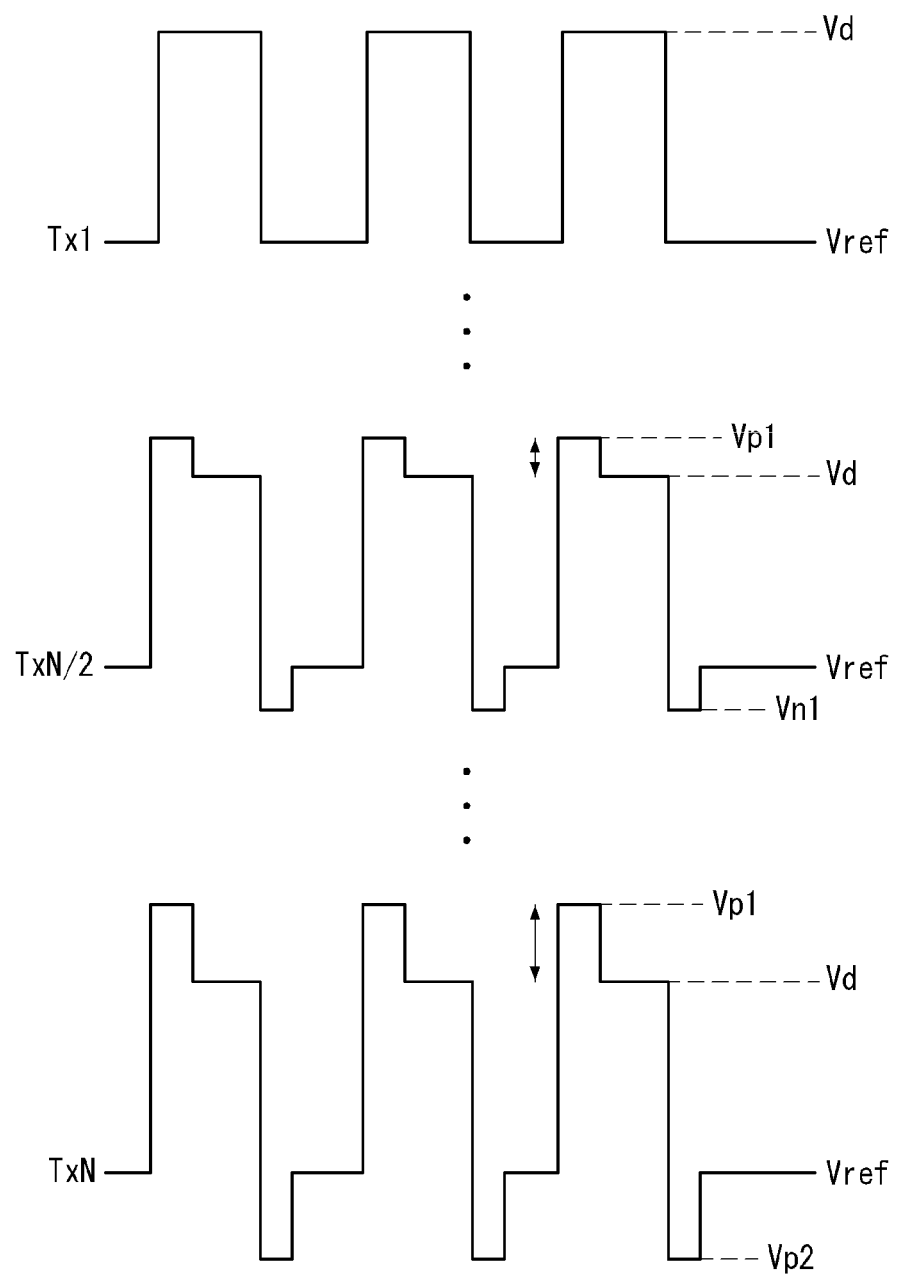
FIG. 14 is a waveform diagram showing driving signals according to a second embodiment of the invention.

As shown in FIG. 12, the touch sensing circuit 30 is generally positioned close to one side of the touch screen TSP. Because the touch sensing circuit 30 is connected to the touch screen TSP, the RC delay of the touch screen TSP increases as the touch screen TSP is far away from the touch sensing circuit 30. As shown in FIGS. 13 and 14, the touch sensing system according to the embodiment of the invention may differently set the pre-charging voltage Vpre and the reverse polarity discharge voltage Vdis of the driving signal depending on a position of the touch screen TSP in consideration of a deviation of the RC delay of the touch screen TSP depending on the position of the touch screen TSP.

FIG. 14 is a waveform diagram showing driving signals according to a second embodiment of the invention.

As shown in FIGS. 13 and 14, the touch screen TSP may be divided into a plurality of blocks B1 to B3. Each of the blocks B1 to B3 includes at least two Tx lines to which the driving signal is applied. FIG. 13 shows that the touch screen TSP is divided into the three blocks B1 to B3. The number of blocks divided from the touch screen TSP is not limited to three.

Because the first block B1 of the touch screen TSP is positioned closest to the touch sensing circuit 30, an RC delay of the first block B1 is less than RC delays of the second and third blocks B2 and B3. On the other hand, because the third block B3 of the touch screen TSP is positioned farthest away from the touch sensing circuit 30, the RC delay of the third block B3 is greater than the RC delays of the first and second blocks B1 and B2. The RC delay of the second block B2 is greater than the RC delay of the first block B1 and is less than the RC delay of the third block B3. A difference between the RC delays of the blocks differently determines the charging and discharging characteristics of the touch sensors Cm. For example, a charge time and a discharge time of the touch sensor Cm formed at a position having the small RC delay are shorter than a charge time and a discharge time of the touch sensor Cm formed at a position having the large RC delay.

As shown in FIG. 14, the touch sensing system according to the embodiment of the invention may differently set the pre-charging voltages Vpre and the reverse polarity discharge voltages Vdis of the blocks divided from the touch screen TSP. The pre-charging voltage Vpre and the reverse polarity discharge voltage Vdis are set to be proportional to the RC delay.

When the touch screen TSP is divided into the plurality of blocks B1 to B3 and thus is dividedly driven as shown in FIG. 13, the pre-charging voltage Vpre and the reverse polarity discharge voltage Vdis of the driving signal applied to the blocks B1 to B3 are proportional to the RC delay of the touch screen TSP as shown in FIG. 14. For example, the pre-charging voltage Vpre and the reverse polarity discharge voltage Vdis of the driving signal applied to the Tx lines of the first block B1 are set to be less than those of the second and third blocks B2 and B3 or are set to a minimum value. The driving signal applied to the first block B1 may be set to have the same waveform as the related art driving signal. Further, the pre-charging voltage Vpre and the reverse polarity discharge voltage Vdis of the driving signal applied to the Tx lines of the third block B3 are set to be greater than those of the first and second blocks B1 and B2. The pre-charging voltage Vpre and the reverse polarity discharge voltage Vdis of the driving signal applied to the Tx lines of the second block B2 are set to be greater than those of the first block B1 and are set to be less than those of the third block B3.

Figure 15:
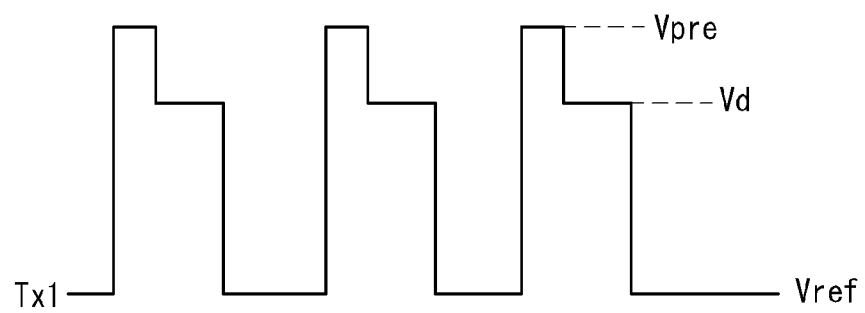
FIG. 15 is a waveform diagram showing driving signals according to a third embodiment of the invention.
Figure 15:
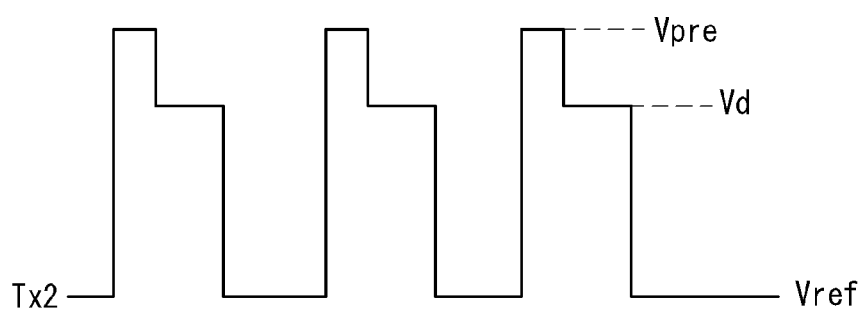
Figure 15:
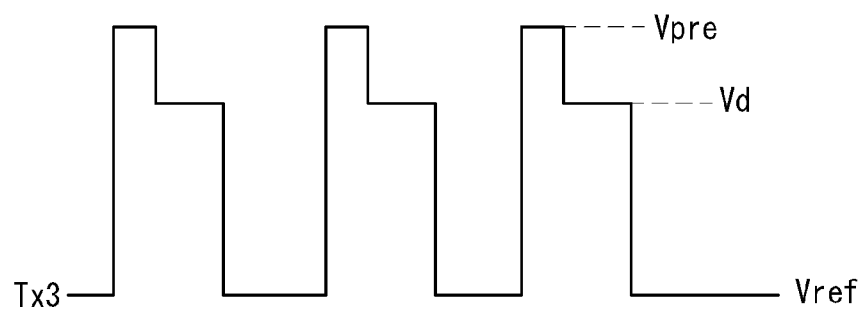
Figure 16:
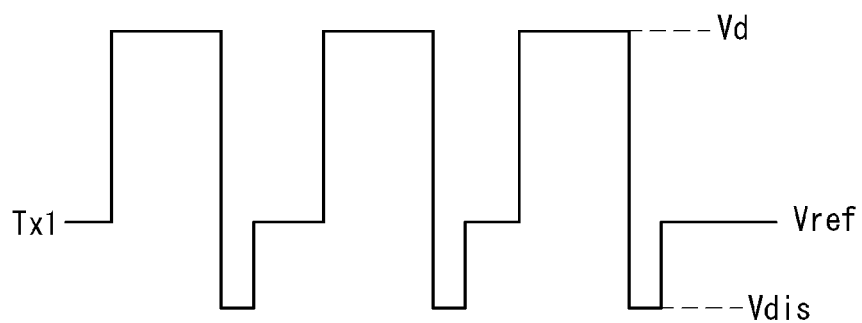
FIG. 16 is a waveform diagram showing driving signals according to a fourth embodiment of the invention.
Figure 16:
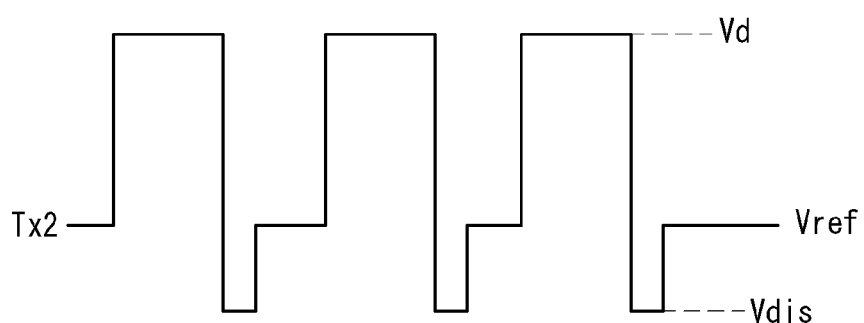
Figure 16:
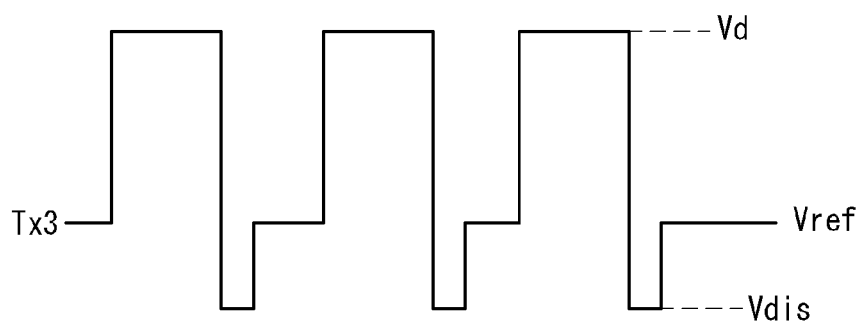

The driving signal according to the embodiment of the invention may be modified as shown in FIGS. 15 and 16 depending on the size or the charging and discharging characteristics of the touch screen TSP.

FIG. 15 is a waveform diagram showing driving signals according to a third embodiment of the invention. FIG. 16 is a waveform diagram showing driving signals according to a fourth embodiment of the invention. As shown in FIG. 15, the driving signal according to the embodiment of the invention is generated in a multi-step waveform including a pre-charging period t1, a high potential holding period t2, and a reference potential period t4 without a discharge acceleration period t3. Alternatively, as shown in FIG. 16, the driving signal according to the embodiment of the invention is generated in a multi-step waveform including a high potential holding period t2, a discharge acceleration period t3, and a reference potential period t4 without a pre-charging period t1.

Figure 17:
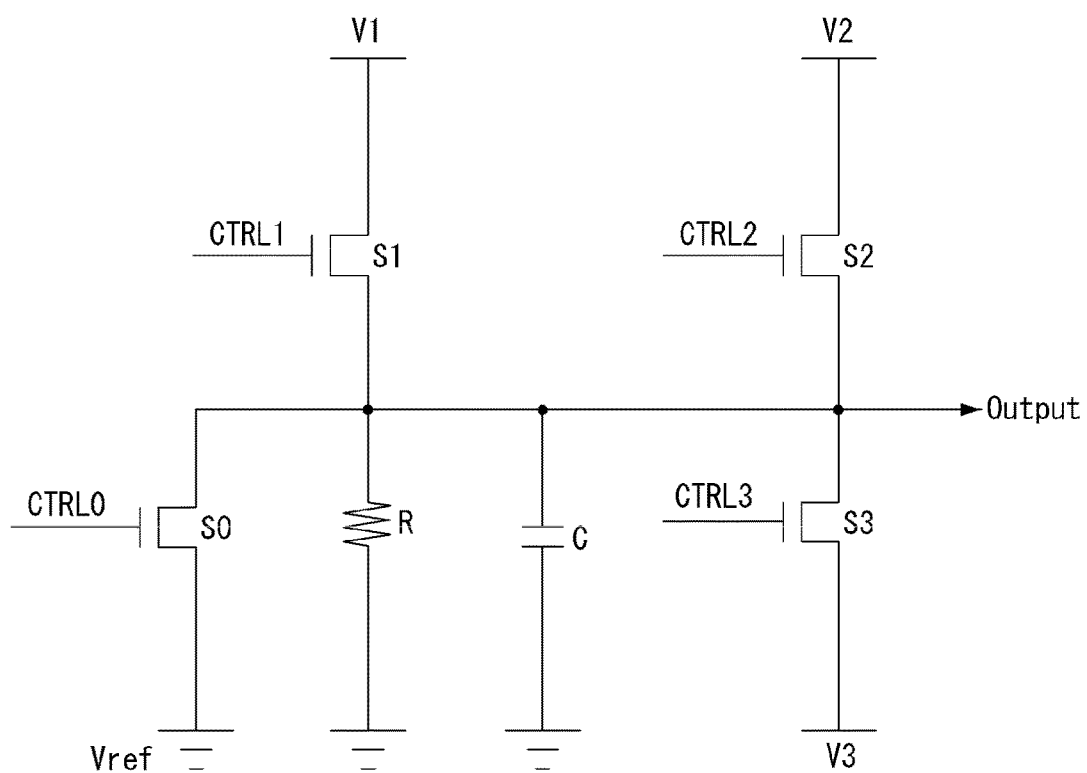
FIG. 17 is a circuit diagram of a driving signal generator according to an exemplary embodiment of the invention.
Figure 18:
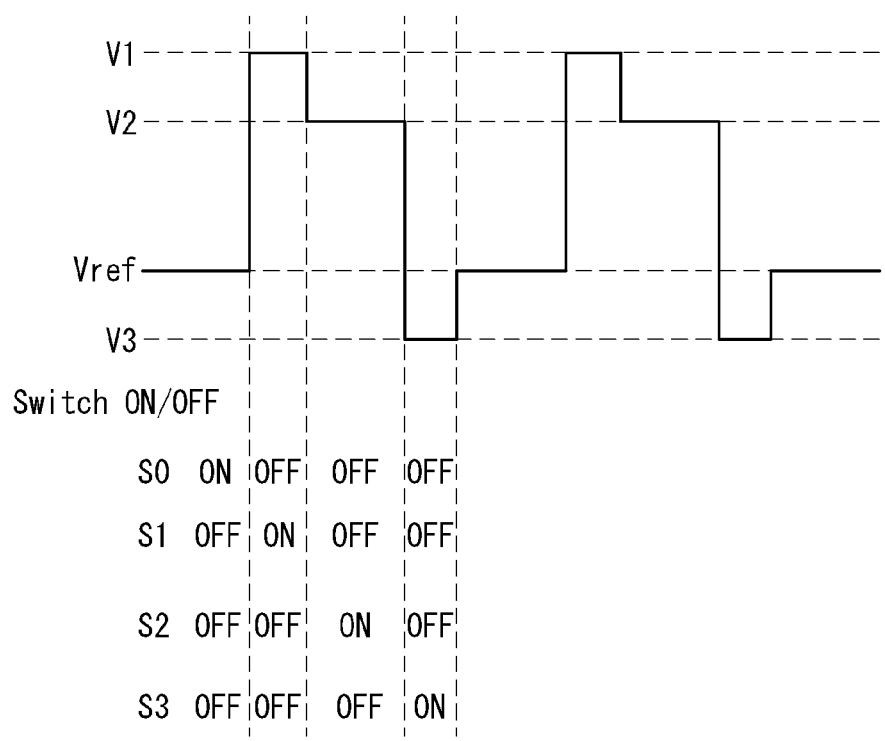
FIG. 18 is a waveform diagram showing on/off timings and an output waveform of switches in a driving signal generator shown in FIG. 17.

FIG. 17 is an exemplary circuit diagram of a driving signal generator according to the embodiment of the invention. The driving signal generator shown in FIG. 17 may be embedded in the Tx driving circuit 32. FIG. 18 is a waveform diagram showing on/off timings and an output waveform of switches in the driving signal generator shown in FIG. 17.

As shown in FIGS. 17 and 18, a driving signal generator according to the embodiment of the invention includes a plurality of switches S0 to S3. Each of the switches S0 to S3 may be implemented as a transistor, for example, a metal-oxide semiconductor field effect transistor (MOSFET). The switches S0 to S3 are controlled by the Tx/Rx controller 38.

The first switch S0 supplies the low potential reference voltage Vref to an output terminal of the driving signal generator in response to a first control signal CTRL0. The output terminal of the driving signal generator is connected to the Tx line. The second switch S1 supplies a first voltage V1 to the output terminal of the driving signal generator in response to a second control signal CTRL1. The first voltage V1 may be selected as the above-described positive pre-charging voltage Vpre. The third switch S2 supplies a second voltage V2 to the output terminal of the driving signal generator in response to a third control signal CTRL2. The second voltage V2 may be selected as the above-described high potential driving voltage Vd. The fourth switch S3 supplies a third voltage V3 to the output terminal of the driving signal generator in response to a fourth control signal CTRL3. The third voltage V3 may be selected as the above-described reverse polarity discharge voltage Vdis. The switches S0 to S3 are turned on when the control signals CTRL0 to CTRL3 are generated in a high logic voltage 'H'. As shown in FIG. 18, the control signals CTRL0 to CTRL3 are sequentially generated in the high logic voltage 'H'. Thus, the switches S0 to S3 are sequentially turned on and generate the driving signal shown in FIGS. 10 and 14 to 16. The driving signal is generated in a multi-step waveform including a pre-charging period during which the first voltage V1 is applied to the touch sensors Cm, a high potential holding period during which the second voltage V2 less than the first voltage V1 is applied to the touch sensors Cm, a discharge acceleration period during which the third voltage V3 less than the second voltage V2 is applied to the touch sensors Cm, and a reference potential period during which a reference voltage Vref which is less than the second voltage V2 and greater than the third voltage V3 is applied to the touch sensors Cm. In the driving signal shown in FIGS. 15 and 16, the second switch S1 or the fourth switch S3 may be omitted.

A method for driving the touch sensing system according to the embodiment of the invention is performed using the driving signal of the above-described multi-step waveform. More specifically, the method includes a step of applying the first voltage V1 of the driving signal having the above-described multi-step waveform to the touch sensors Cm to pre-charge the touch sensors Cm, a step of applying the second voltage V2 to the touch sensors Cm to hold the voltage of the touch sensors Cm to a high potential voltage, a step of applying the third voltage V3 to the touch sensors Cm to accelerate the discharge of the touch sensors Cm, and a step of applying the reference voltage Vref to the touch sensors Cm to maintain the discharge of the touch sensors Cm.

Figure 19:
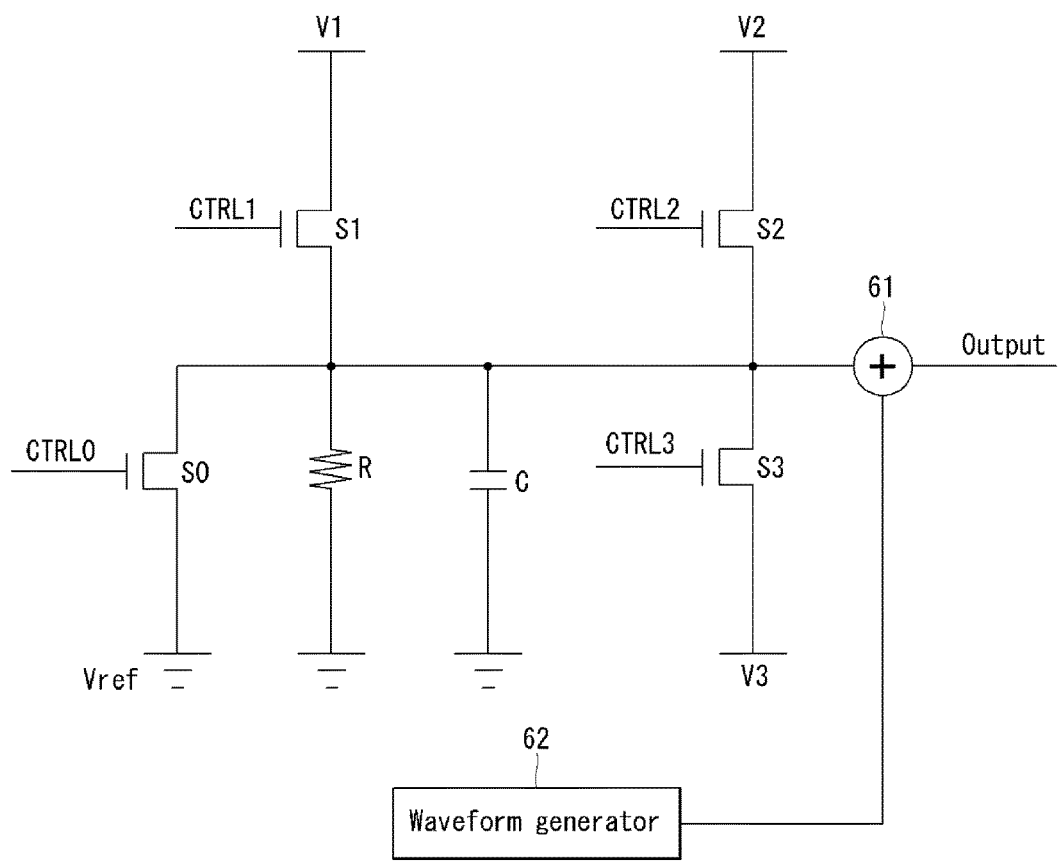
FIG. 19 is a circuit diagram of a driving signal generator according to another embodiment of the invention.
Figure 20:
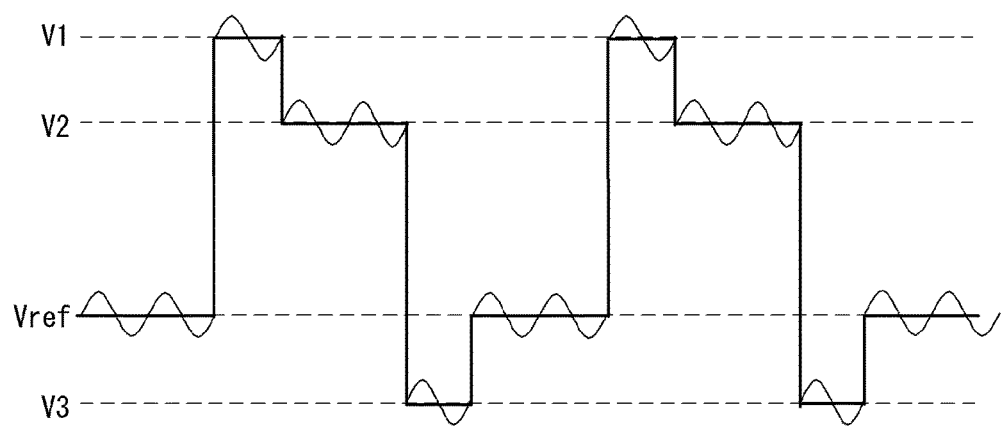
FIG. 20 is a waveform diagram showing an output waveform of a driving signal generator according to a fifth embodiment of the invention.

As shown in FIG. 19, a resistor R and a capacitor C may be connected between the output terminal of the driving signal generator and a ground level voltage source GND. The resistor R and the capacitor C remove a noise such as a ripple and stabilize an output voltage. An adder 61 and a waveform generator 62 may be connected to the output terminal of the driving signal generator. The waveform generator 62 may generate a waveform such as a sine wave, a triangle wave, and a sawtooth wave. The adder 61 adds an output of the waveform generator 62 to the voltage of the multi-step waveform applied by the driving signal generator. When the output of the waveform generator 62 is the sine wave, an output, i.e., the driving signal of the adder 61 may be generated as shown in FIG. 20. FIG. 20 is a waveform diagram showing an output waveform of the driving signal generator according to a fifth embodiment of the invention. As described above, at least a portion of the driving signal according to the embodiment of the invention may include one of the sine wave, the triangle wave, and the sawtooth wave and may be modified in various waveforms.

As shown in FIGS. 12 and 13, the touch sensing circuit 30 is disposed at a position close to one side of the touch screen TSP. As described above, because the touch sensing circuit 30 is connected to the touch screen TSP, the RC delay of the touch screen TSP increases as the touch screen TSP is far from the touch sensing circuit 30. The touch sensing system according to the embodiment of the invention may generate the driving signal shown in FIGS. 21 to 29, so as to compensate for the RC delay of the touch screen TSP varying depending on the position of the touch screen TSP. As shown in FIGS. 21 to 29, at least one of a width and a voltage of the driving signal increases in proportion to the RC delay of the touch screen, or the number of the driving signals increases in proportion to the RC delay of the touch screen. Further, as shown in FIGS. 21 to 29, each driving signal may include at least one of the pre-charging period and the discharge acceleration period.

Figure 21:
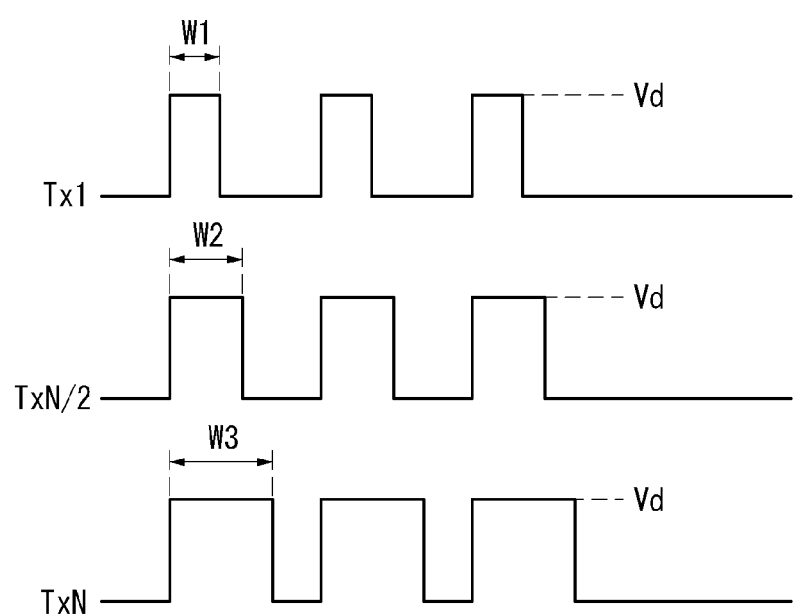
FIG. 21 is a waveform diagram showing driving signals according to a sixth embodiment of the invention.
Figure 22:
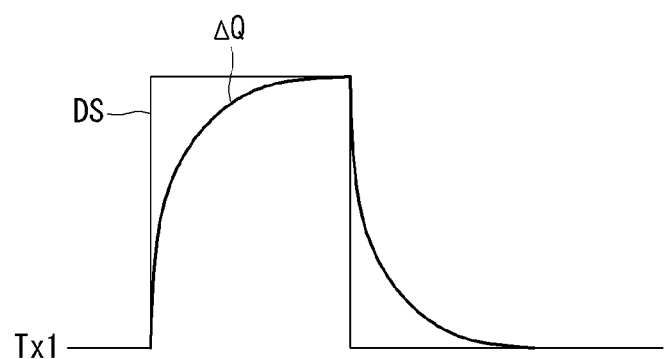
FIG. 22 is a waveform diagram showing changes in a charge amount when a width of driving signals shown in FIG. 21 changes.
Figure 22:
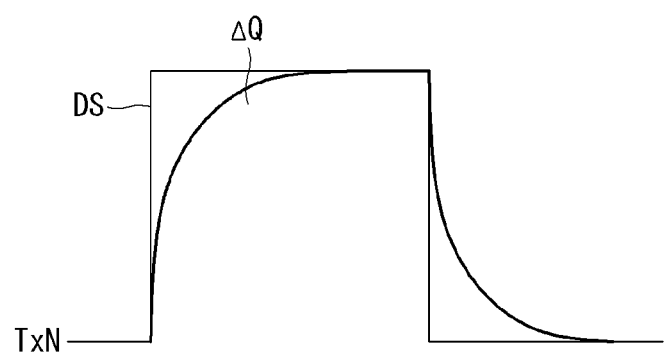

FIG. 21 is a waveform diagram showing driving signals according to a sixth embodiment of the invention. FIG. 22 is a waveform diagram showing changes in a charge amount when a width of the driving signal shown in FIG. 21 changes.

As shown in FIGS. 21 and 22, the touch screen TSP may be divided into a plurality of blocks B1 to B3 in the same way as FIG. 13. Each of the blocks B1 to B3 includes two or more Tx lines to which the driving signal is applied.

Because the touch sensing circuit 30 is closer to the first block B1 than to the other blocks B2 and B3, RC delay of the first block B1 is less than RC delays of the other blocks B2 and B3. On the other hand, because the third block B3 is farthest from the touch sensing circuit 30, the third block B3 has the largest RC delay. Thus, the RC delay of the second block B2 is greater than the RC delay of the first block B1 and is less than the RC delay of the third block B3. Such a difference between the RC delays of the blocks results in a difference between charge characteristics of the touch sensors Cm. For example, a charge amount of the touch sensor Cm formed at a position having a small RC delay is more than a charge amount of the touch sensor Cm formed at a position having a large RC delay.

When the touch screen TSP is divided into the plurality of blocks B1 to B3 and thus is dividedly driven, widths of the driving signals applied to the Tx lines belonging to the same block are equally set. On the other hand, widths of the driving signals applied to the different blocks are different.

When the touch screen TSP is divided into the plurality of blocks B1 to B3 and thus is dividedly driven, widths W1 to W3 of the driving signals applied to the blocks B1 to B3 are proportional to the RC delays of the blocks B1 to B3 as shown in FIG. 21. For example, the width W1 of the driving signal applied to the Tx lines of the first block B1 having the small RC delay is set to be less than the widths W2 and W3 of the other blocks B2 and B3. The width W3 of the driving signal applied to the Tx lines of the third block B3 having the large RC delay is set to be greater than the widths W1 and W2 of the other blocks B1 and B2. The width W2 of the driving signal applied to the Tx lines of the second block B2 is set to be greater than the width W1 of the first block B1 and less than the width W3 of the third block B3.

As shown in FIG. 21, the embodiment of the invention may differently set the widths W1 to W3 of the driving signals applied to the different blocks, but is not limited thereto. For example, the driving signal applied to the first Tx line Tx1 has the smallest width, and the width of the driving signal may gradually increase as it goes to the Nth Tx line TxN in proportion to the RC delay.

The related art applies the driving signals having the same width to all of the touch sensors Cm without considering the RC delay of the touch screen TSP. In FIG. 22, an upper waveform diagram shows an exemplary driving signal according to the related art, which is applied in the same waveform at all of the positions of the touch screen TSP. As a result, in the related art, a charge amount $\Delta Q$ of the touch sensor Cm having the large RC delay is small. On the other hand, the embodiment of the invention increases the width of the driving signal applied to the touch sensor Cm having the large RC delay as in a lower waveform diagram of FIG. 22. As a result, the embodiment of the invention may increase a hold time of a driving voltage Vd applied to the touch sensor Cm having the large RC delay, and thus a charge amount $\Delta Q$ of the touch sensor Cm may increase by that of the touch sensor Cm having the small RC delay. Thus, the embodiment of the invention may uniformize the charge amount of the touch sensors Cm at all of the positions of the touch screen TSP.

Figure 23:
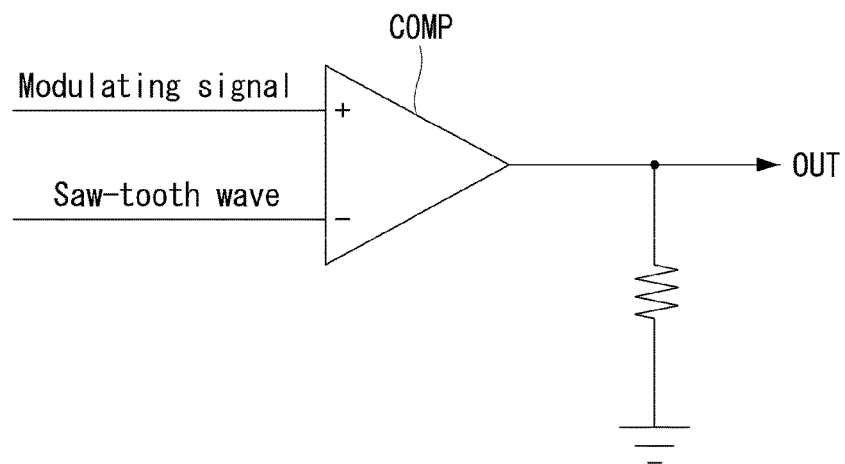
FIG. 23 is an exemplary circuit diagram of a driving signal generator outputting driving signals shown in FIG. 21.
Figure 24:
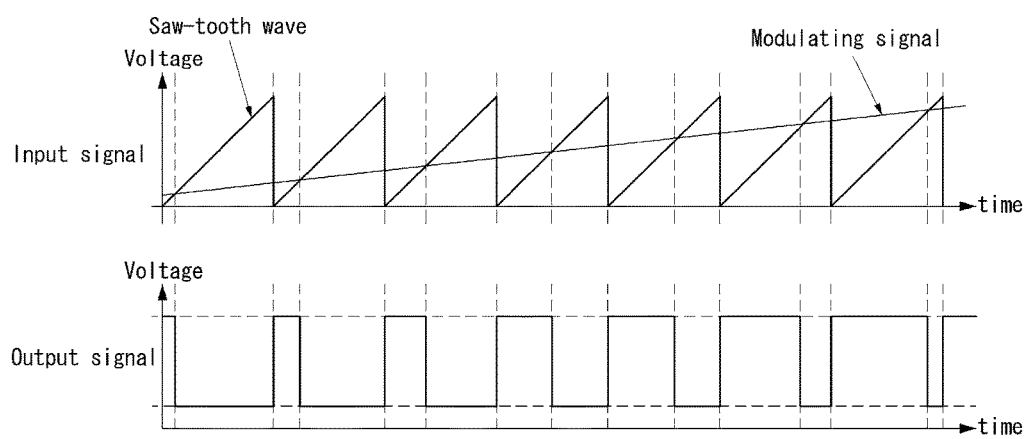
FIG. 24 is a waveform diagram showing input and output signals of a driving signal generator shown in FIG. 23.

FIG. 23 is an exemplary circuit diagram of the driving signal generator outputting the driving signals shown in FIG. 21. The driving signal generator may be embedded in the Tx driving circuit 32. FIG. 24 is a waveform diagram showing input and output signals of the driving signal generator shown in FIG. 23.

As shown in FIGS. 23 and 24, the driving signal generator may be implemented as a pulse width modulation (PWM) circuit. The PWM circuit may be simply implemented as a comparator COMP. A modulating signal and a sawtooth wave signal are input to the comparator COMP. When a voltage of the modulating signal is greater than a voltage of the sawtooth wave signal, the comparator COMP generates a high potential output and generates the driving signal, which has the varying widths W1 to W3 depending on a voltage level of the modulating signal. Thus, the touch sensing system according to the embodiment of the invention may generate the driving signal having the width proportional to the RC delay of the touch screen TSP using a method for increasing the voltage of the modulating signal as the RC delay of the touch screen TSP increases.

Figure 25:
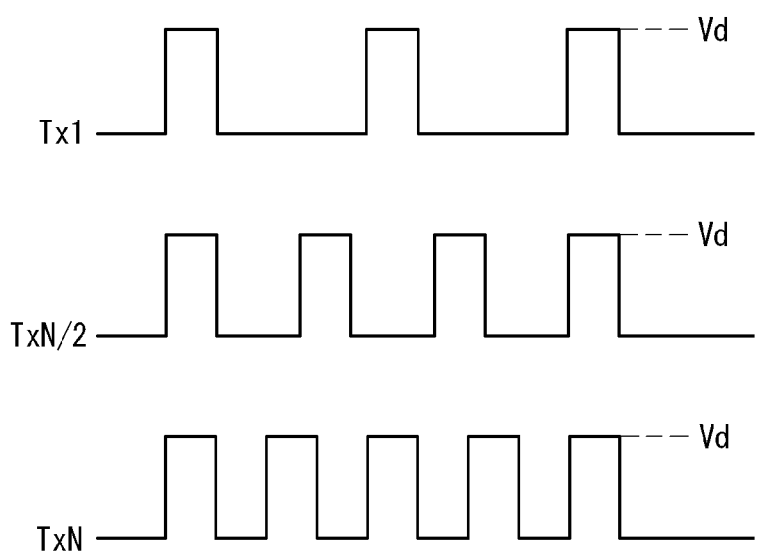
FIG. 25 is a waveform diagram showing driving signals according to a seventh embodiment of the invention.
Figure 26:
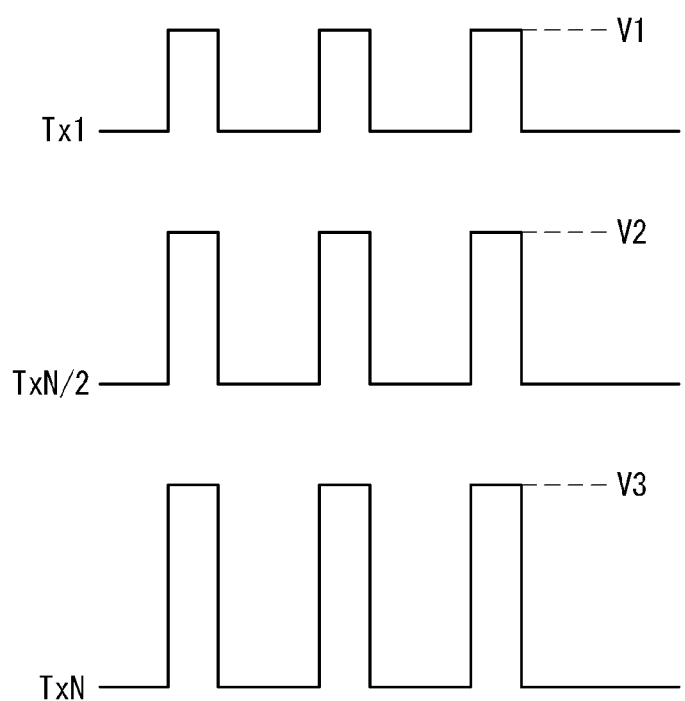
FIG. 26 is a waveform diagram showing driving signals according to an eighth embodiment of the invention.

FIG. 25 is a waveform diagram showing driving signals according to a seventh embodiment of the invention. FIG. 26 is a waveform diagram showing driving signals according to an eighth embodiment of the invention.

As shown in FIG. 25, the touch sensing system according to the embodiment of the invention may control the number of driving signals in proportion to the RC delay of the touch screen TSP. The number of driving signals applied to the touch sensor Cm of the touch screen TSP having the large RC delay is more than the number of driving signals applied to the touch sensor Cm of the touch screen TSP having the small RC delay at the same period of time. As the number of driving signals increases, the charge amount of the touch sensors Cm increases. The driving signal shown in FIG. 25 may be produced by a pulse frequency modulation (PFM) circuit or a pulse position modulation (PPM) circuit.

As shown in FIG. 26, the touch sensing system according to the embodiment of the invention may control voltages V1 to V3 of the driving signal in proportion to the RC delay of the touch screen TSP. The voltage of the driving signal applied to the touch sensor Cm of the touch screen TSP having the large RC delay is greater than the voltage of the driving signal applied to the touch sensor Cm of the touch screen TSP having the small RC delay. As the voltage of the driving signal increases, the charge amount of the touch sensors Cm increases. The driving signal shown in FIG. 26 may be produced by a pulse amplitude modulation (PAM) circuit.

Figure 27:
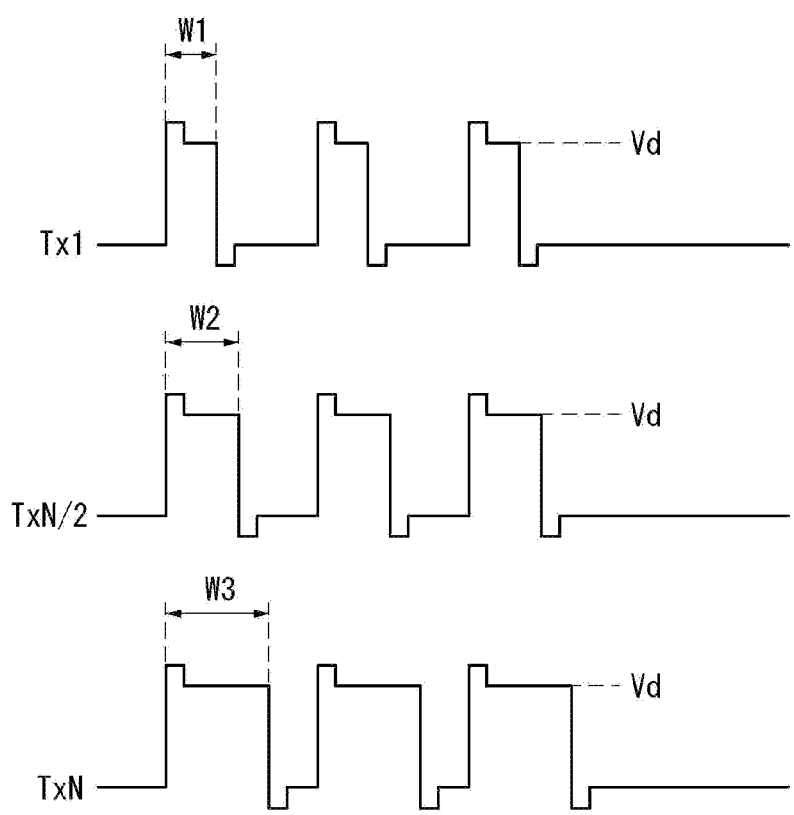
FIG. 27 is a waveform diagram showing driving signals according to a ninth embodiment of the invention.
Figure 28:
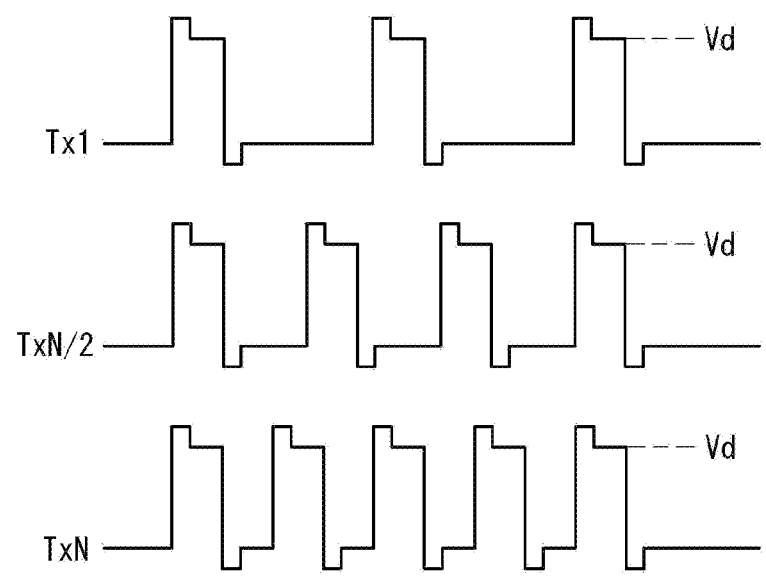
FIG. 28 is a waveform diagram showing driving signals according to a tenth embodiment of the invention.
Figure 29:
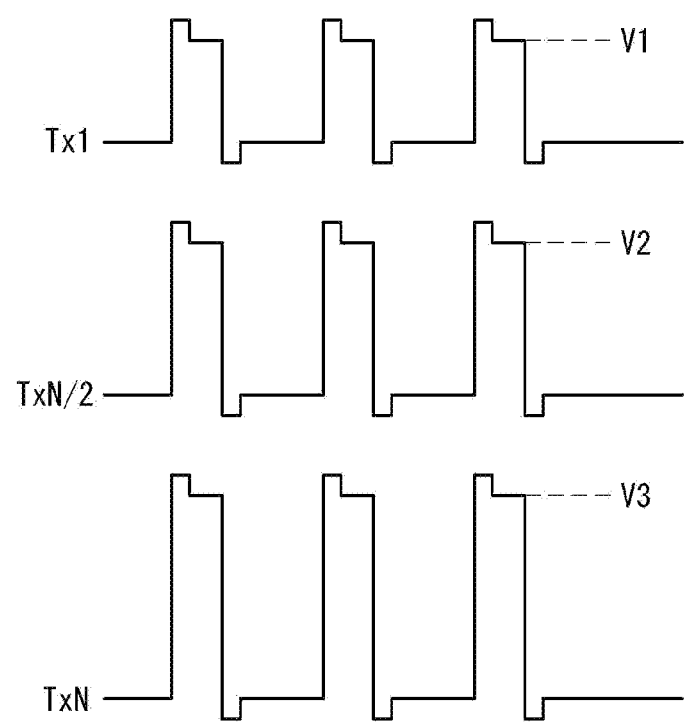
FIG. 29 is a waveform diagram showing driving signals according to an eleventh embodiment of the invention.
Figure 30:
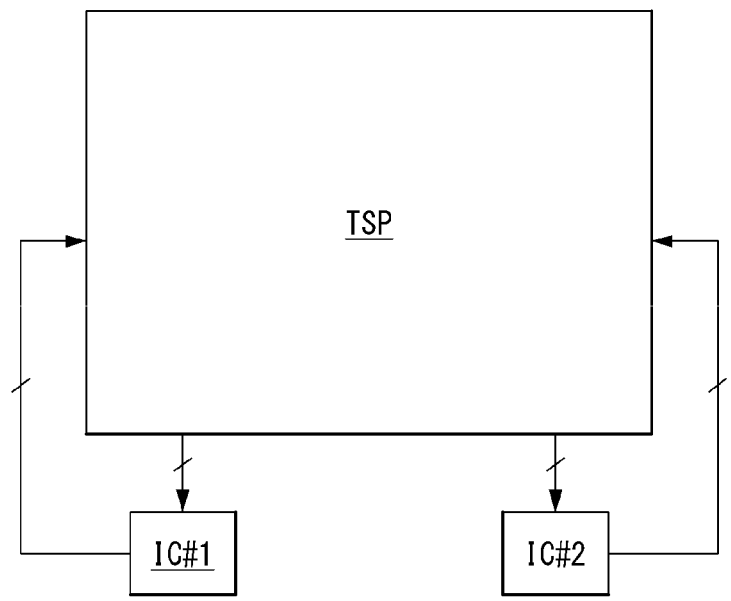
FIG. 30 shows an example of connecting a plurality of touch ICs to a touch screen.

The driving signals shown in FIGS. 21, 25, and 26 may be modified to a waveform including a pre-charging period t1 and a discharge acceleration period t3 as shown in FIGS. 27 to 29. Further, the touch sensing system according to the embodiment of the invention may control the driving signals shown in FIGS. 21 to 29 on a per block basis as shown in FIG. 13. At least one of the width and the voltage of the driving signal increases in proportion to the RC delay of the touch screen TSP, or the number of driving signals increases in proportion to the RC delay of the touch screen TSP.

As described above, the embodiment of the invention increases at least one of the width and the voltage of the driving signal in proportion to the RC delay of the touch screen TSP or increases the number of driving signals in proportion to the RC delay of the touch screen TSP. Hence, even if the size of the touch screen increases, the embodiment of the invention may compensate for the RC delay of the touch screen and may uniformize the charge characteristics of the touch sensors, thereby increasing the charge amount of the touch sensors. Further, the touch sensing system according to the embodiment of the invention pre-charges the touch sensors during the pre-charging period of the driving signal, thereby increasing a charging velocity of the touch sensors. The embodiment of the invention accelerates the discharge of the touch sensors during the discharge acceleration period of the driving signal. As a result, the embodiment of the invention rapidly and uniformly charges the touch sensors to a sufficient amount of charges and discharges undesired remaining charges in a short period of time. Even if the size of the touch screen increases, the embodiment of the invention may reduce the noise of the touch signal and may increase the touch sensitivity.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system, comprising:
a touch screen including touch sensors; and
a touch sensing circuit comprising:
   a touch transmission circuit configured to apply respective driving signals to the touch sensors; and
   a touch reception circuit configured receive sensed voltages from the touch sensors,
wherein the touch transmission circuit is further configured to:
   apply at least one first driving signal to a first touch sensor, and
   apply at least one second driving signal to a second touch sensor,
wherein the first touch sensor is driven by the at least one first driving signal from the touch transmission circuit,
wherein the second touch sensor is driven by the at least one second driving signal from the touch transmission circuit,
wherein the touch sensing circuit is disposed on one side of the touch screen,
wherein a distance between the second touch sensor and the touch sensing circuit is longer than a distance between the first touch sensor and the touch sensing circuit,
wherein a voltage of the at least one second driving signal from the touch transmission circuit during a reception period is greater than a voltage of the at least one first driving signal from the touch transmission circuit during the reception period, and
wherein the voltage of each of the first and second driving signals increases in proportion to RC delay.

2. The touch sensing system of claim 1, wherein:
the touch screen is divided into a plurality of blocks;
each of the plurality of blocks includes at least two lines to which the driving signal is applied;
the voltages of the driving signals applied to one block are the same; and
the voltage of the driving signal applied to a block having relatively large RC delay among the plurality of blocks is greater than the driving signal applied to a block having relatively small RC delay.

3. The touch sensing system of claim 1, wherein:
the driving signal includes a pre-charging period during which a first voltage is applied to the touch sensors, and a high potential holding period during which a second voltage less than the first voltage is applied to the touch sensors; and
the pre-charging period is set to be earlier than the high potential holding period.

4. The touch sensing system of claim 3, wherein:
the driving signal further includes a discharge acceleration period during which a third voltage less than the second voltage is applied to the touch sensors, and a reference potential period during which a reference voltage, which is less than the second voltage and greater than the third voltage, is applied to the touch sensors; and
the discharge acceleration period is set to be arranged between the high potential holding period and the reference potential period.

5. The touch sensing system of claim 4, wherein the driving signal is generated in one waveform of a sine wave, a triangle wave, and a sawtooth wave.

6. The touch sensing system of claim 5, wherein:
the touch screen is divided into a plurality of blocks;
each of the plurality of blocks includes at least two lines to which the driving signal is applied;
the first and third voltages applied to one block are equal to each other; and
the first and third voltages applied to one block of the plurality of blocks are set to be different from the first and third voltages applied to other blocks.

7. The touch sensing system of claim 6, wherein the first and third voltages are proportional to the RC delay of the touch screen.

8. The touch sensing system of claim 7, wherein the first and third voltages of the driving signal applied to a first block positioned closest to the touch sensing circuit are set to be less than the first and third voltages applied to other blocks or are set to a minimum value.

9. The touch sensing system of claim 8, wherein:
the first and third voltages of the driving signal applied to a third block positioned farthest away from the touch sensing circuit are greater than the first and third voltages applied to other blocks; and
the first and third voltages of the driving signal applied to a second block positioned between the first block and the third block are greater than the first and third voltages of the driving signal applied to the first block and are less than the first and third voltages of the driving signal applied to the third block.

10. A method for driving a touch sensing system including a touch screen including touch sensors and a touch sensing circuit comprising a touch transmission circuit applying respective driving signal signals to the touch sensors and a touch reception circuit receiving sensed voltages from the touch sensors, the method comprising:
applying, by the touch transmission circuit, at least one first driving signal to a first touch sensor; and
applying, by the touch transmission circuit, at least one second driving signal to a second touch sensor,
wherein the first touch sensor is driven by the at least one first driving signal from the touch transmission circuit,
wherein the second touch sensor is driven by the at least one second driving signal from the touch transmission circuit,
wherein the touch sensing circuit is disposed on one side of the touch screen,
wherein a distance between the second touch sensor and the touch sensing circuit is longer than a distance between the first touch sensor and the touch sensing circuit,
wherein a voltage of the at least one second driving signal from the touch transmission circuit is greater than a voltage of the at least one first driving signal from the touch transmission circuit, and
wherein and the voltage of each of the first and second driving signals increases in proportion to RC delay.

11. The method of claim 10, wherein:
the touch screen is divided into a plurality of blocks;
each of the plurality of blocks includes at least two lines to which the driving signal is applied;
the voltages of the driving signals applied to one block are the same; and
the voltage of the driving signal applied to a block having relatively large RC delay among the plurality of blocks is greater than the driving signal applied to a block having relatively small RC delay.

12. The method of claim 11, wherein:

the driving signal includes a pre-charging period during which a first voltage is applied to the touch sensors, and a high potential holding period during which a second voltage less than the first voltage is applied to the touch sensors; and the pre-charging period is set to be earlier than the high potential holding period.

13. The method of claim 12, wherein:

the driving signal further includes a discharge acceleration period during which a third voltage less than the second voltage is applied to the touch sensors, and a reference potential period during which a reference voltage, which is less than the second voltage and greater than the third voltage, is applied to the touch sensors; and the discharge acceleration period is set to be arranged between the high potential holding period and the reference potential period.

14. The method of claim 13, wherein:

the touch screen is divided into a plurality of blocks;

each of the plurality of blocks includes at least two lines to which the driving signal is applied;

the first and third voltages applied to one block are equal to each other; and the first and third voltages applied to one block of the plurality of blocks are set to be different from the first and third voltages applied to other blocks.

15. The method of claim 14, wherein the first and third voltages are proportional to the RC delay of the touch screen.

16. The method of claim 15, wherein the first and third voltages of the driving signal applied to a first block positioned closest to the touch sensing circuit are set to be less than the first and third voltages applied to other blocks or are set to a minimum value.

17. The method of claim 16, wherein:

the first and third voltages of the driving signal applied to a third block positioned farthest away from the touch sensing circuit are greater than the first and third voltages applied to other blocks; and the first and third voltages of the driving signal applied to a second block positioned between the first block and the third block are greater than the first and third voltages of the driving signal applied to the first block and are less than the first and third voltages of the driving signal applied to the third block.

* * * * *